US012776340B2

(12) United States Patent
Urata

(10) Patent No.: US 12,776,340 B2
(45) Date of Patent: Oct. 27, 2026

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventor: Yukio Urata, Sagamihara Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 19/174,841

(22) Filed: Apr. 9, 2025

(65) Prior Publication Data

US 2026/0057902 A1 Feb. 26, 2026

(30) Foreign Application Priority Data

Aug. 22, 2024 (JP) ................................ 2024-140889

(51) Int. Cl.

*G11B 5/012* (2006.01)
*G11B 5/09* (2006.01)
*G11B 5/55* (2006.01)

(52) U.S. Cl.

CPC ................ *G11B 5/012* (2013.01); *G11B 5/09* (2013.01); *G11B 5/5547* (2013.01)

(58) Field of Classification Search

CPC ..... G11B 19/048; G11B 5/455; G11B 5/6076; G11B 220/2516; G11B 2005/0021
USPC .......................................................... 360/75
See application file for complete search history.

(56) References Cited

U.S. PATENT DOCUMENTS

| | | | | |
|---|---|---|---|---|
| 5,247,254 | A | 9/1993 | Huber et al. | |
| 6,606,211 | B1 | 8/2003 | Lim et al. | |
| 8,749,905 | B1 | 6/2014 | Malina | |
| 8,879,186 | B1 * | 11/2014 | Xia ...................... | G11B 20/182 360/75 |
| 9,117,489 | B1 | 8/2015 | Dang et al. | |
| 9,142,246 | B1 | 9/2015 | Trantham et al. | |
| 10,255,943 | B1 * | 4/2019 | Schick ............. | G11B 20/10018 |
| 2022/0122636 | A1 | 4/2022 | Watanabe | |
| 2025/0299691 | A1 | 9/2025 | Watanabe | |

FOREIGN PATENT DOCUMENTS

| | | | |
|---|---|---|---|
| JP | 5015876 | B2 | 8/2012 |
| JP | 2022-67411 | A | 5/2022 |
| JP | 2025-144002 | A | 10/2025 |

OTHER PUBLICATIONS

U.S. Appl. No. 18/753,550, filed Jun. 25, 2024.

* cited by examiner

*Primary Examiner* — Nabil Z Hindi
(74) *Attorney, Agent, or Firm* — Kim & Stewart LLP

(57) ABSTRACT

According to one embodiment, a magnetic disk device includes recording layers, write heads, read heads, a selector circuit that allows two or more read heads to be selected from among the read heads, a read target selection unit, a read processing unit, and a detection unit. When the read target selection unit selects the first recording layer and the second recording layer the read processing unit controls driving of the selector circuit and causes the selector circuit to select the first read head and the second read head to read data of the first recording layer and data of the second recording layer simultaneously, and the detection unit detects a state of the first recording layer and a state of the second recording layer.

9 Claims, 20 Drawing Sheets

MAGNETIC DISK DEVICE

CROSS-REFERENCE TO RELATED APPLICATIONS

This application is based upon and claims the benefit of priority from Japanese Patent Application No. 2024-140889, filed Aug. 22, 2024, the entire contents of which are incorporated herein by reference.

FIELD

Embodiments described herein relate generally to a magnetic disk device.

BACKGROUND

Known magnetic disk devices include conventional magnetic recording (CMR) type (or conventional recording type) magnetic disk devices in which data are written to a plurality of tracks at intervals in the radial direction of a disk, shingled magnetic recording (SMR) type magnetic disk devices in which data are overwritten to a plurality of tracks in the radial direction of a disk, and hybrid recording type magnetic disk device which selects one of conventional magnetic recording type or the shingled magnetic recording type.

BRIEF DESCRIPTION OF THE DRAWINGS

FIG. 12 is a block diagram showing a configuration of part of the magnetic disk device according to the comparative example, and also showing a configuration of a read channel and the like.

DETAILED DESCRIPTION

In general, according to one embodiment, there is provided a magnetic disk device comprising: a plurality of recording layers including a first recording layer and a second recording layer which are provided on a same disk or different disks; a plurality of write heads including a first write head which writes data to the first recording layer and a second write head which writes data to the second recording layer; a plurality of read heads including a first read head which reads data from the first recording layer and a second read head which reads data from the second recording layer; a selector circuit connected to the plurality of read heads to allow two or more read heads to be selected from among the plurality of read heads; a read target selection unit; a read processing unit which allows a read process to be performed to read data from each of the recording layers; and a detection unit. When the read target selection unit selects the first recording layer and the second recording layer: the read processing unit controls driving of the selector circuit and causes the selector circuit to select the first read head and the second read head to read data of the first recording layer and data of the second recording layer simultaneously through the selector circuit; and the detection unit detects a state of the first recording layer and a state of the second recording layer based on a signal read by the first read head and a signal read by the second read head.

A magnetic disk device 1 according to a comparative example and an embodiment will be described in detail below with reference to the drawings.

Comparative Example

Figure 1:
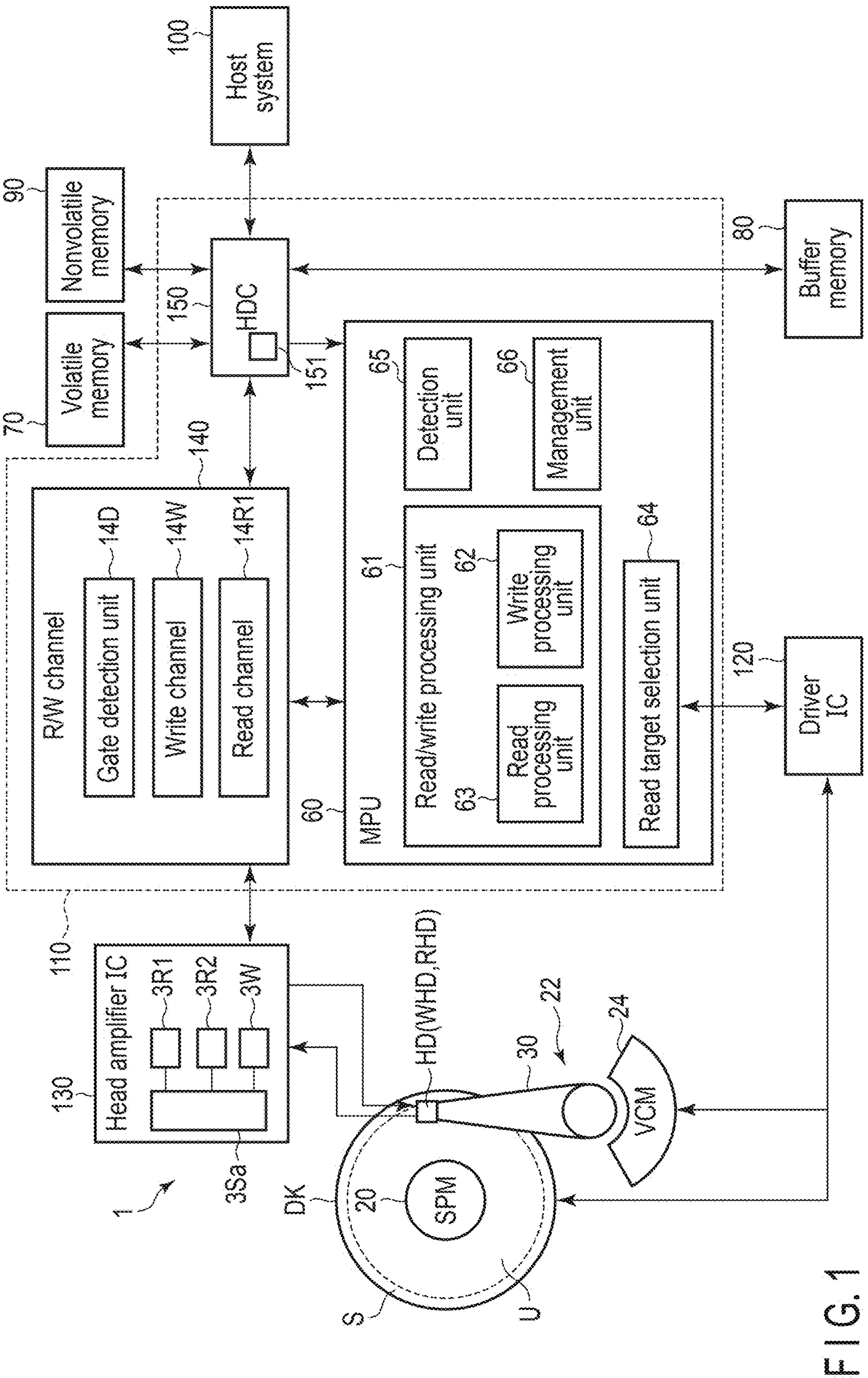
FIG. 1 is a block diagram showing a configuration of a magnetic disk device according to a comparative example.

First, a description of the configuration of the magnetic disk device 1 according to the comparative example will be provided. FIG. 1 is a block diagram showing a configuration of a magnetic disk device 1 according to the comparative example. In the comparative example, the magnetic disk device 1 is a hybrid recording magnetic disk device which selects one of conventional magnetic recording and shingled magnetic recording. However, the technology described below may be applied to a conventional magnetic recording-type magnetic disk device or a shingled magnetic recording-type magnetic disk device.

As shown in FIG. 1, the magnetic disk device 1 comprises a plurality of disks (magnetic disks) DK, for example, one to ten disks, as recording media, a spindle motor (SPM) 20 as a drive motor, a head stack assembly 22, a driver IC 120, a head amplifier integrated circuit (hereinafter referred to as a head amplifier IC) 130, a volatile memory 70, a buffer memory (buffer) 80, a nonvolatile memory 90, and a system controller 110, which is a single-chip integrated circuit. In addition, the magnetic disk device 1 is connected to a host system (hereinafter simply referred to as a host) 100.

Each disk DK is, for example, formed to have a diameter of 97 mm (3.8 inches) and has a recording layer (magnetic recording layer) on both sides. In this comparative example, the magnetic disk device 1 is provided with 1 to 11 disks DK; however, the number of disks DK is not limited thereto.

The head stack assembly 22 can control moving a head HD mounted on an arm 30 to a target position on the disk DK by driving a voice coil motor (hereinafter referred to as VCM) 24, i.e., can seek. The VCM 24 functions as an actuator.

The disk DK has, in data writeable areas thereof, a user data area U, which can be used by a user, and a system area S, which is used to write information necessary for system management.

The head HD records and reproduces information on the disk DK. The head HD has a slider as its main body, and comprises a write head WHD and a read head RHD mounted on the slider. The write head WHD writes data to a recording layer of the disk DK. The read head RHD reads data from a data track of the recording layer of the disk DK.

In some cases, "a center portion of the head HD" is referred to as the "head HD", "a center portion of the write head WHD" is referred to as the "write head WHD", and "a center portion of the read head RHD" is referred to as the "read head RHD". In some cases, the "center portion of the write head WHD" is simply referred to as the "head HD", and in other cases, the "center portion of the read head RHD" is simply referred to as the "head HD".

The driver IC 120 controls driving the SPM 20 and the VCM 24 in accordance with the control of the system controller 110 (in detail, an MPU 60 described below). The SPM 20 supports and rotates a plurality of disks DK.

The head amplifier IC 130 comprises a selection circuit 3Sa, a read amplifier 3R1, a read amplifier 3R2, and a write driver 3W. The read amplifier 3R1 and the read amplifier 3R2 are each a preamplifier that amplifies a read signal read from the disk DK and outputs it to the system controller 110 (in detail, to a read/write (R/W) channel 140, which will be described later). The write driver 3W outputs a write current corresponding to the signal output from the R/W channel 140 to the head HD.

The volatile memory 70 is a semiconductor memory in which stored data is lost when power supply is cut off. The volatile memory 70 stores data, etc., necessary for processing in each part of the magnetic disk device 1. The volatile memory 70 is random access memory (RAM). The volatile memory 70 is, for example, dynamic random access memory (DRAM). However, the volatile memory 70 may also be synchronous dynamic random access memory (SDRAM).

The buffer memory 80 is a semiconductor memory that temporarily records data, etc., transmitted and received between the magnetic disk device 1 and the host 100. Note that, the buffer memory 80 may be integrated with the volatile memory 70. The buffer memory 80 is volatile RAM. Examples include DRAM, static random access memory (SRAM), SDRAM, ferroelectric random access memory (FeRAM), and magnetoresistive random access memory (MRAM).

The buffer memory 80 includes an area used as a read cache and a write cache, and temporarily stores commands received from the host 100, etc.

The nonvolatile memory 90 is a semiconductor memory that stored data even when the power supply is cut off. The nonvolatile memory 90 is, for example, a NAND-type flash read only memory (FROM). However, the nonvolatile memory 90 may also be a NOR-type FROM.

The system controller (controller) 110 is realized, for example, by using a large scale integrated circuit (LSI) called a system-on-a-chip (SoC) in which a plurality of elements are integrated on a single chip. The system controller 110 includes the read/write (R/W) channel 140, a hard disk controller (HDC) 150, and the microprocessor (MPU) 60. The system controller 110 is electrically connected to the driver IC 120, the head amplifier IC 130, the volatile memory 70, the buffer memory 80, the nonvolatile memory 90, and the host 100.

The R/W channel 140 executes signal processing of read data transferred from the disk DK to the host 100 and write data transferred from the host 100 in response to instructions from the MPU 60 described below. The R/W channel 140 has a circuit or function for modulating write data. The R/W channel 140 also has a circuit or function for measuring the signal quality of the read data. The R/W channel 140 is electrically connected to, for example, the head amplifier IC 130, the HDC 150, and the MPU 60.

The HDC 150 controls data transfer between the host 100 and the R/W channel 140 in response to instructions from the MPU 60 described below. The HDC 150 is electrically connected to, for example, the R/W channel 140, the MPU 60, the volatile memory 70, the buffer memory 80, and the nonvolatile memory 90.

The HDC 150 has a gate generation unit 151. The gate generation unit 151 generates various types of gates, such as write gates, read gates, and servo gates, in response to commands from the host 100, instructions from the MPU 60, etc., and outputs them to the R/W channel 140, such as to a gate detection unit 14D. In the following, “raising a predetermined gate” may also be referred to as “asserting a predetermined gate”. Also, “lowering a predetermined gate” may be referred to as “negating a predetermined gate”. “Asserting a predetermined gate” and “negating a predetermined gate” may also include the meaning of “generating a predetermined gate”. Note that the gate generation unit 151 may be included in the R/W channel 140 or the MPU 60.

The R/W channel 140 has a gate detection unit 14D. The gate detection unit 14D detects whether various gates, such as write gates, read gates, and servo gates, are in the asserted state or the negated state.

For example, in a case where the gate detection unit 14D detects that a write gate is asserted, it executes write processing, and in a case where it detects that the write gate is negated, it suspends (stops) the write processing.

In addition, in a case where the gate detection unit 14D detects that a read gate is asserted, it executes read processing, and in a case where it detects that the read gate is negated, it stops the read processing. The gate detection unit 14D executes servo read processing in a case where it detects that a servo gate is asserted, and stops the servo read processing in a case where it detects that the servo gate is negated. Note that the gate detection unit 14D may also be located in the HDC 150 or the MPU 60.

The MPU 60 is a control unit that controls each part of the magnetic disk device 1 and is a main controller. The MPU 60 controls the VCM 24 via the driver IC 120 and executes servo control to position the head HD. The MPU 60 controls a write operation of data to the disk DK and selects a destination for storing write data transferred from the host 100. In addition, the MPU 60 controls a read operation of data from the disk DK and controls processing of read data transferred from the disk DK to the host 100. The MPU 60 is connected to each part of the magnetic disk device 1. The MPU 60 is electrically connected to, for example, the driver IC 120, the R/W channel 140, and the HDC 150.

The MPU 60 comprises a read/write processing unit 61, a read target selection unit 64, a detection unit 65, a management unit 66, etc. The MPU 60 executes processing of each of these units, such as the read/write processing unit 61, the read target selection unit 64, the detection unit 65, the management unit 66, on the firmware. Note that the MPU 60 may also comprise each of these units as a circuit.

The read/write processing unit 61 has a write processing unit 62 and a read processing unit 63. In accordance with commands from the host 100, the write processing unit 62 controls data write processing, and the read processing unit 63 controls data read processing, causing the read head RHD to read data from the disk DK. The write processing unit 62 is capable of executing write processing to write data to each of the recording layers of the disk DK. The read/write processing unit 61 controls the VCM 24 via the driver IC 120 to position the head HD at a target position (a predetermined radial position) on the disk DK and execute read or write processing.

Figure 2:
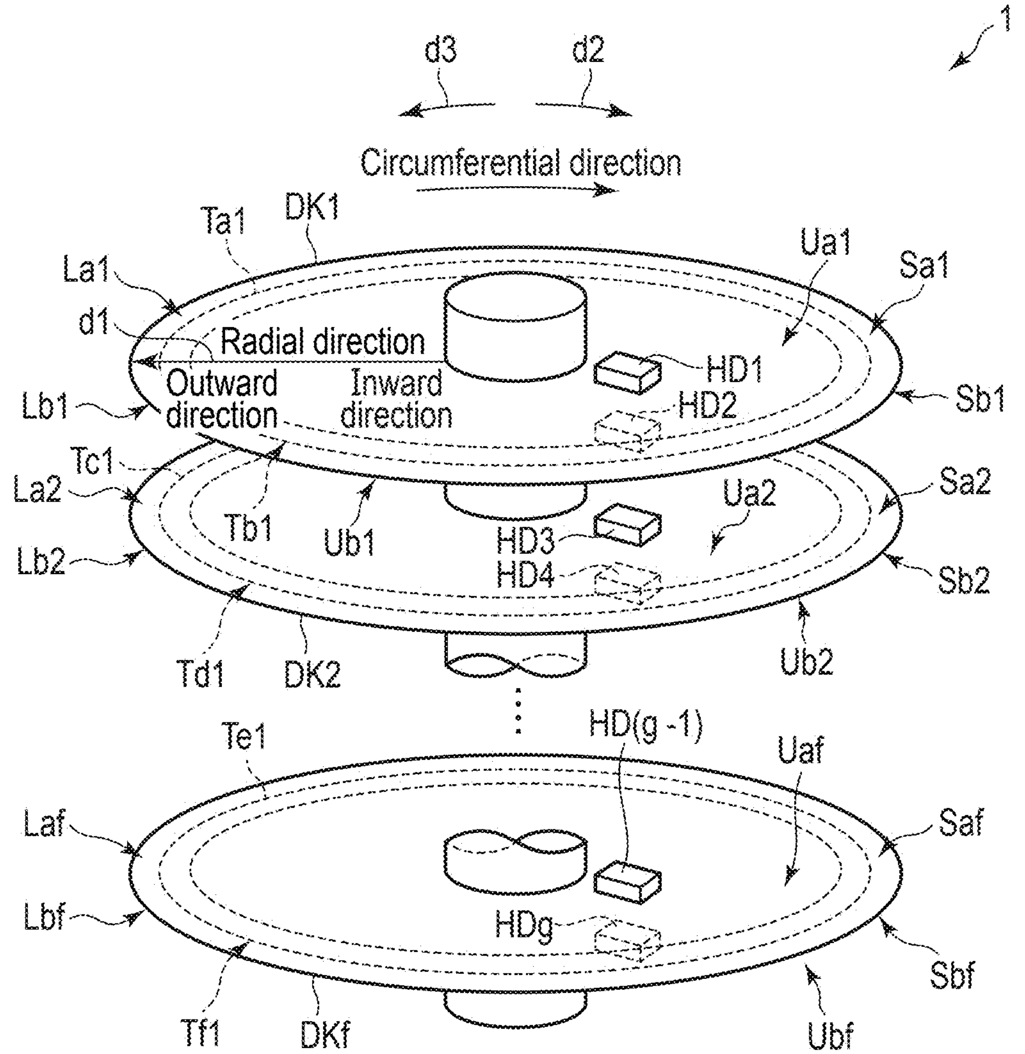
FIG. 2 is a perspective view showing part of the magnetic disk device and also showing a plurality of disks and a plurality of heads.

FIG. 2 is a perspective view showing part of the magnetic disk device 1, and shows a plurality of disks DK and a plurality of heads HD.

As shown in FIG. 2, a direction in which the disk DK rotates in a circumferential direction is referred to as a rotation direction d3. Note that, in the example shown in FIG. 2, the rotation direction d3 is shown as counterclockwise; however, it may also be in an opposite direction (clockwise). In addition, a traveling direction d2 of the head HD relative to the disk DK is in an opposite direction to the rotation direction d3. The traveling direction d2 is a direction in which the head HD sequentially writes and reads data with respect to the disk DK in the circumferential direction, that is, the direction in which the head HD travels with respect to the disk DK in the circumferential direction.

The magnetic disk device 1 comprises f disks of disks DK1 to DKf and g heads of heads HD1 to HDg.

In the comparative example, the number of heads HD is twice the number of disks DK ($g=2\times f$).

Disks DK1 to DKf are arranged coaxially and stacked with a gap between them. The diameter of disks DK1 to DKf is the same. Here, the terms “same”, “identical”, “match”, and “equivalent” include the meaning of being exactly the same as well as the meaning of being different to the extent that they can be considered to be substantially the same. Note that the diameter of disks DK1 to DKf may differ from each other.

Each disk DK has a recording layer L on both sides. A plurality of recording layers L are provided on the same disk or different disks DK. For example, the disk DK1 has a first recording layer La1 and a second recording layer Lb1 on the opposite side of the first recording layer La1. The disk DK2 has a first recording layer La2 and a second recording layer Lb2 on the opposite side of the first recording layer La2. The disk DKi has a first recording layer Lai and a second recording layer Lbi on the opposite side of the first recording layer Lai. Each of the first recording layers La may also be referred to as a front surface or a recording surface. Each of the second recording layers Lb may also be referred to as a back surface or a recording surface.

However, each of the first recording layers La may also be referred to as the back surface. In this case, each of the second recording layers Lb may also be referred to as the front surface.

Each recording layer L has a user data area U and a system area S. The first recording layer La1 has a user data area Ua1 and a system area Sa1. The second recording layer Lb1 has a user data area Ub1 and a system area Sb1. The first recording layer La2 has a user data area Ua2 and a system area Sa2. The second recording layer Lb2 has a user data area Ub2 and a system area Sb2. The first recording layer Laf has a user data area Uaf and a system area Saf. The second recording layer Lbf has a user data area Ubf and a system area Sbf.

In the user data area Ua1 (first recording layer La1), a track sandwiched between double broken lines in the drawing is track Ta1. In the user data area Ub1 (second recording layer Lb1), a track located on an opposite side of track Ta1 is track Tb1.

In the user data area Ua2 (first recording layer La2), a track sandwiched between double broken lines in the drawing is track Tc1. In the user data area Ub2 (second recording layer Lb2), a track located on an opposite side of track Tc1 is track Td1.

In the user data area Uaf (first recording layer Laf), a track sandwiched between double broken lines in the drawing is track Te1. In the user data area Ubf (second recording layer Lbf), a track located on an opposite side of track Te1 is track Tf1.

In the comparative example, tracks Ta1, Tb1, Tc1, Td1, Te1, and Tf1 are located on a same cylinder. Note here that the tracks Ta1, Tb1, Tc1, Td1, Te1, and Tf1 may not be located on the same cylinder. In such a case, the tracks Ta1, Tb1, Tc1, Td1, Te1, and Tf1 may be located to be shifted in position along a radial direction d1.

The head HD is facing the disk DK. In the comparative example, each recording layer L of the disk DK faces one head HD. For example, the head HD1 faces the first recording layer La1 of the disk DK1, writes data to the first recording layer La1, and reads data from the first recording layer La1. The head HD2 faces the second recording layer Lb1 of the disk DK1, writes data to the second recording layer Lb1, and reads data from the second recording layer Lb1.

The head HD3 faces the first recording layer La2 of the disk DK2, writes data to the first recording layer La2, and reads data from the first recording layer La2. The head HD4 faces the second recording layer Lb2 of the disk DK2, writes data to the second recording layer Lb2, and reads data from the second recording layer Lb2. The head HDg-1 faces the first recording layer Laf of the disk DKf, writes data to the first recording layer Laf, and reads data from the first recording layer Laf. The head HDg faces the second recording layer Lbf of the disk DKf, writes data to the second recording layer Lbf, and reads data from the second recording layer Lbf.

Figure 3:
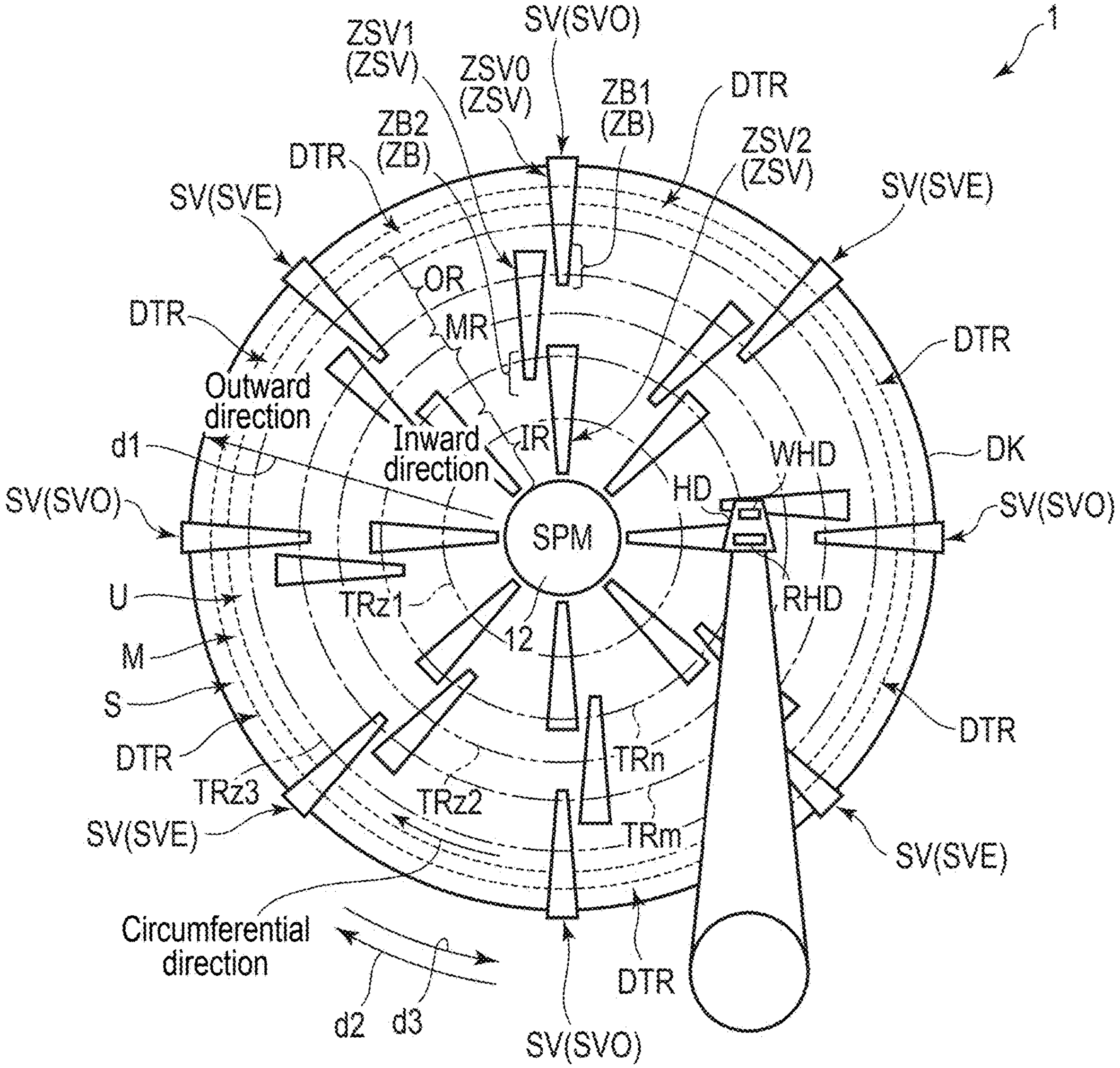
FIG. 3 is a schematic diagram showing an example of the arrangement of a plurality of servo areas and a plurality of data areas in one disk according to the comparative example.

FIG. 3 is a schematic view showing an example of an arrangement of a plurality of servo areas SV and a plurality of data areas DTR of a single disk DK according to this comparative example. As shown in FIG. 3, a direction towards an outer circumference of the disk DK in a radial direction d1 of the disk DK is referred to as an outer direction (outside), and a direction opposite to the outer direction is referred to as an inner direction (inside).

In FIG. 3, the user data area U is divided into an inner circumferential area IR, which is located in the inner direction, an outer circumferential area OR, which is located in the outer direction, and a middle circumferential area MR, which is located between the inner circumferential area IR and the outer circumferential area OR.

The disk DK has a plurality of servo areas SV and a plurality of data areas DTR. The plurality of servo areas SV may be, for example, radially extended in the radial direction d1 of the disk DK and arranged discretely at predetermined intervals in the circumferential direction. The plurality of servo areas SV may be, for example, linearly extended from the inner circumference to the outer circumference and arranged discretely at predetermined intervals in the circumferential direction. For example, the plurality of servo areas SV may extend spirally from the inner circumference to the outer circumference at predetermined intervals in the circumferential direction. In addition, the plurality of servo areas SV may be arranged, for example, in an island shape in the radial direction d1 and may be arranged discretely by changing predetermined intervals in the circumferential direction.

In the following, a single servo area SV in a predetermined track may be referred to as a "servo sector". Note that a "servo area SV" may be referred to as a "servo sector SV". A servo sector contains servo data. In the following, "the arrangement of several servo data that make up a servo sector, etc." may be referred to as a "servo pattern". Note that "servo data written to a servo sector" may be referred to as a "servo sector".

A plurality of data areas DTR are each arranged between a plurality of servo areas SV. For example, a data area DTR corresponds to an area between two consecutive servo areas SV in the circumferential direction. In the following, a data area DTR in a predetermined track may be referred to as a "data sector". Note that the "data area DTR" may be referred to as the "data sector DTR". The data sector contains user data. Note that "user data written to a data sector" may be referred to as a "data sector". The "data sector" may be referred to as "user data". In addition, "a pattern made up by several data" may be referred to as "data pattern". In the example shown in FIG. 3, the data pattern of a predetermined track is configured by a plurality of servo data (servo sectors) and a plurality of user data (data sectors).

The servo area SV has a plurality of zone servo areas ZSV, etc. Note that, in addition to the zone servo areas ZSV, the servo area SV may also include an area that includes a gap (a difference in circumferential position between two zone servo areas), an area that includes servo data, and a data area DTR, etc. The plurality of zone servo areas ZSV are arranged discretely along a radial direction d1. The plurality of zone servo areas ZSV extend in the radial direction d1.

One zone servo area (servo area) ZSV in a predetermined track may be called a "zone servo sector" or a "servo sector". Note that the "zone servo area (servo area) ZSV" may also be referred to as a "zone servo sector ZSV" or a "servo sector ZSV". "Servo data written to the zone servo sector" may also be referred to as a "zone servo sector" or a "servo sector". In the following, "the arrangement of several servo data that make up the zone servo sector, etc." may also be referred to as a "zone servo pattern" or a "servo pattern". In the following, a single servo area SV in a predetermined track may also be referred to as a "zone pattern sector".

Note that the "servo area SV" may be referred to as a "zone pattern sector". "At least one data item, etc., written to the zone pattern sector" may be referred to as the "zone pattern sector". The zone pattern sector includes at least one zone servo sector. In the following, "data pattern of the zone pattern sector" may be referred to as a "zone data pattern".

In the example shown in FIG. 3, the servo area SV has zone servo areas ZSV0, ZSV1, and ZSV2. The zone servo areas ZSV0, ZSV1, and ZSV2 are arranged in a staggered pattern in the radial direction d1. The zone servo areas ZSV0, ZSV1, and ZSV2 may also be arranged in a staircase pattern in the radial direction d1.

The zone servo area ZSV2 is located on the inner circumferential side of the zone servo area ZSV1. The zone servo area ZSV0 is located on the outer circumferential side of the zone servo area ZSV1. For example, the zone servo area ZSV2 is arranged from the inner circumferential area IR to the middle circumferential area MR, the zone servo area ZSV1 is arranged from the inner circumferential area IR to the outer circumferential area OR, and the zone servo area ZSV0 is arranged from the middle circumferential area MR to the outer circumferential area OR. In the following, in a predetermined servo area SV, a predetermined area in the radial direction in which a plurality of zone servo areas ZSV are arranged in the circumferential direction may be referred to as a zone servo boundary area, a double servo area, or a double zone servo area ZB.

In the example shown in FIG. 3, a main servo area SVO and a sub-servo area SVE are arranged alternately at intervals in the circumferential direction. For example, one sub-servo area SVE is arranged between two main servo areas SVO that are aligned continuously at intervals in the circumferential direction. In other words, one sub-servo area SVE is arranged between two main servo areas SVO that are aligned continuously at intervals in the circumferential direction. For example, in a case where all the servo areas SV on the disk DK are numbered sequentially, the main servo area SVO corresponds to the odd-numbered servo areas SV, and the sub-servo area SVE corresponds to the even-numbered servo areas SV. Note that two or more sub-servo areas SVE may be arranged between two main servo areas SVO that are aligned continuously at intervals in the circumferential direction.

The main servo area SVO and the sub-servo area SVE may, for example, be configured only by a servo area (hereinafter, sometimes referred to as a normal servo area) that reads and demodulates servo data in its entirety. In the following, "reading and demodulating servo data" may be referred to as "servo reading". The main servo area SVO and the sub-servo area SVE may, for example, be configured by a normal servo area and a servo area (hereinafter referred to as a short servo area) in which servo data is servo read in a circumferential range smaller than the circumferential range of the servo data servo read in the normal servo area.

A media cache M is allocated to the disk DK. However, the media cache M does not have to be arranged in the disk DK.

By using the above-mentioned plurality of servo data, for example, a positioning error of the head HD (e.g., write head WHD) can be derived.

In the description of this comparative example, an example of a case in which the number of zones on the disk DK is three is described; however, the number of zones on the disk DK can be changed in various ways. The number of zones on the disk DK can be 30 to 40. In addition, each zone has a plurality of bands. For example, each zone has several hundred bands.

Figure 4:
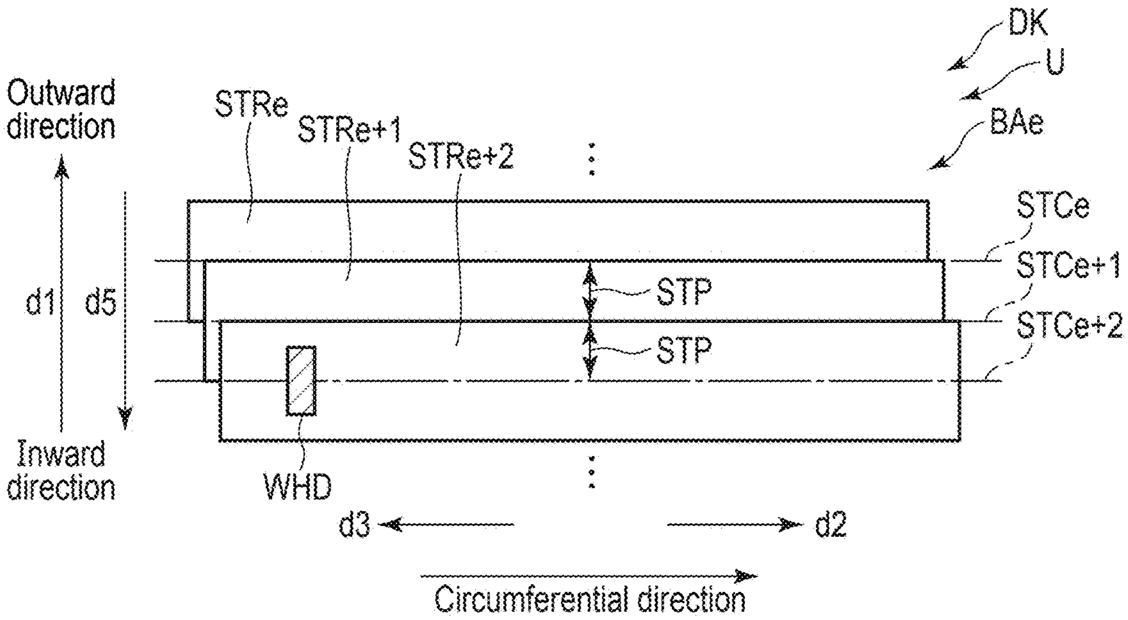
FIG. 4 is a schematic diagram showing a write head and three tracks of a user data area in which a shingled magnetic recording process is performed for the disk shown in FIG. 3.

FIG. 4 is a schematic view showing three tracks STR of the user data area U on which shingled magnetic recording processing is performed on the disk DK shown in FIG. 3, and the write head WHD. The user data area U is a shingled magnetic recording area.

Within the user data area U, it is permitted to write data sequentially in units of bands, that is, shingled magnetic recording is permitted.

As shown in FIG. 4, the write head WHD can sequentially write data to the disk DK in the traveling direction d2. The read head RHD shown in FIG. 3 can also sequentially read data written to the disk DK in the traveling direction d2.

The direction in which shingled magnetic recording is performed continuously on a plurality of tracks STR, which are a plurality of data tracks, in a direction parallel to the radial direction d1, that is, the direction in which the next track STR to be written is overlapped on the previously written track STR in the radial direction d1, is referred to as a overwrite direction or a recording progress direction. In band BAe shown in FIG. 4, a overwrite direction d5 corresponds to the inner direction; however, the overwrite direction may also correspond to the outer direction.

For example, the overwrite direction applied to a plurality of bands BA (a plurality of zones Z) located on the outer circumferential side of a specific radial position and the overwrite direction applied to a plurality of bands BA (a plurality of zones Z) located on the inner circumferential side of the above-mentioned specific radial position may be opposite to each other.

The band BAe has a plurality of tracks STR, including tracks STRe, STRe+1, and STRe+2. Tracks STRe, STRe+1, and STRe+2 are continuously overwritten in the overwrite direction d5 in the order in which they are described. Of tracks STRe, STRe+1, and STRe+2, track STRe corresponds to the track on which data is written first, and track STRe+2 corresponds to the track on which data is written last.

Track STRe has a track center STCe at the center of the radial direction d1 in a case where no other tracks are overwritten. Track STRe+1 has a track center STCe+1 at the center of the radial direction d1 in a case where no other tracks are overwritten. Track STRe+2 has a track center STCe+2 at the center of the radial direction d1 in a case where no other tracks are overwritten.

In the example shown in FIG. 4, tracks STRe, STRe+1, and STRe+2 are written at a pitch (shingled magnetic recording track pitch) STP. The track center STCe of track STRe and the track center STCe+1 of track STRe+1 are separated by pitch STP in the radial direction d1. The track center STCe+1 of track STRe+1 and the track center STCe+2 of track STRe+2 are separated by pitch STP in the radial direction d1. Tracks STRe to STRe+2 may be written with different pitches.

The width of the radial direction d1 of the area of track STRe where track STRe+1 is not overwritten is the same as the width of the radial direction d1 of the area of track STRe+1 where track STRe+2 is not overwritten. Note that the width of the radial direction d1 of the area of track STRe where track STRe+1 is not overwritten and the width of the radial direction d1 of the area of track STRe+1 where track STRe+2 is not overwritten may differ.

In FIG. 4, for convenience of explanation, each track STR is shown as a rectangular shape; however, in reality, each track STR is curved along the circumferential direction. Also, each track STR may be wavy, extending in the circumferential direction while varying in the radial direction d1. Note that, in FIG. 4, three tracks STR are overwritten; however, two tracks STR may be overwritten, or more than three tracks STR may be overwritten.

The write processing unit 62 can select a shingled magnetic recording type in which data is written in an overlapping manner onto a plurality of tracks STR in the overwrite direction d5, and cause the write head WHD to write data onto each band BA. In the example shown in FIG. 4, the write processing unit 62 sequentially performs shingled magnetic recording on tracks STRe to STRe+2 in band BAe in the inner direction (overwrite direction d5) at pitch STP. Since the user data area U is an area where data is written in the shingled magnetic recording type, it is possible to improve the recording density of the user data area U.

The write processing unit 62 writes track STRe+1 in the inner direction of track STRe at pitch STP, and overwrites a portion of the inner circumferential side of track STRe with track STRe+1. The write processing unit 62 writes track STRe+2 in the inner direction of track STRe+1 at pitch STP, and overwrites a portion of the inner circumferential side of track STRe+1 with track STRe+2.

Figure 5:
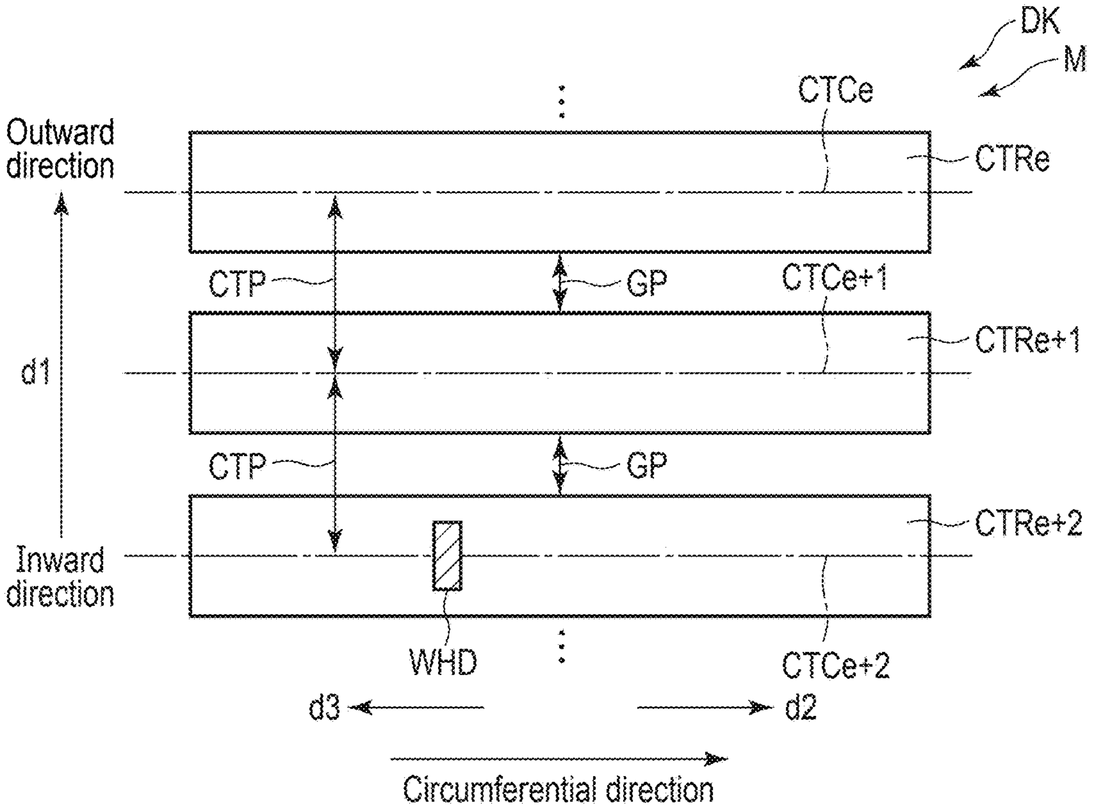
FIG. 5 is a schematic diagram showing a write head and three tracks of media cache in which a conventional magnetic recording process is performed for the disk shown in FIG. 3.

FIG. 5 is a schematic view showing three tracks CTR of the media cache M on which conventional magnetic recording processing is performed on the disk DK shown in FIG. 3, and the write head WHD. The media cache M and the system area S shown in FIG. 3 are conventional magnetic recording areas. In the media cache M and the system area S, random data writing is permitted, that is, conventional magnetic recording is permitted.

As shown in FIG. 5, the media cache M has a plurality of tracks CTR, including tracks CTRe, CTRe+1, and CTRe+2. The plurality of tracks CTR are each data tracks. For example, the width (track width) of tracks CTRe, CTRe+1, and CTRe+2 in the radial direction d1 is the same. Note that the track widths of tracks CTRe to CTRe+2 may differ from each other.

Track CTRe has a track center CTCe at the center of the radial direction d1, track CTRe+1 has a track center CTCe+1 at the center of the radial direction d1, and track CTRe+2 has a track center CTCe+2 at the center of the radial direction d1. In the example shown in FIG. 5, tracks CTRe, CTRe+1, and CTRe+2 are written at a pitch (conventional magnetic recording track pitch) CTP. The track center CTCe of track CTRe is separated from the track center CTCe+1 of track CTRe+1 by pitch CTP. The track center CTCe+1 of track CTRe+1 and the track center CTCe+2 of track CTRe+2 are separated by pitch CTP.

Tracks CTRe and CTRe+1 are separated by a gap GP. Tracks CTRe+1 and CTRe+2 are separated by the gap GP. Note that tracks CTRe to CTRe+2 may be written with different pitches. In FIG. 5, for convenience of explanation, each track CTR is shown as a rectangular shape; however, in reality, each track CTR is curved along the circumferential direction. Also, each track CTR may be wavy, extending in the circumferential direction while varying in the radial direction d1.

The write processing unit 62 can execute write processing by selecting a conventional magnetic recording type that writes data to a plurality of tracks CTR at intervals in the radial direction d1 of the disk DK. In the example shown in FIG. 5, the write processing unit 62 performs conventional magnetic recording on track CTRe or a predetermined sector of track CTRe in a predetermined area of the disk DK by positioning the write head WHD at the track center CTCe.

The write processing unit 62 performs conventional magnetic recording on track CTRe+1 or a predetermined sector of track CTRe+1 by positioning the write head WHD at the track center CTCe+1, which is separated from the track center CTCe of track CTRe by pitch CTP in the inner direction. The write processing unit 62 performs conventional magnetic recording on track CTRe+2 or a predetermined sector of track CTRe+2 by positioning the write head WHD at the track center CTCe+2, which is separated from the track center CTCe+1 of track CTRe+1 by pitch CTP in the inner direction.

The write processing unit 62 may sequentially perform conventional magnetic recording on tracks CTRe, CTRe+1, and CTRe+2 in a predetermined area of the disk DK, or may randomly perform conventional magnetic recording on predetermined sectors of track CTRe, predetermined sectors of track CTRe+1, and predetermined sectors of track CTRe+2.

Figure 6:
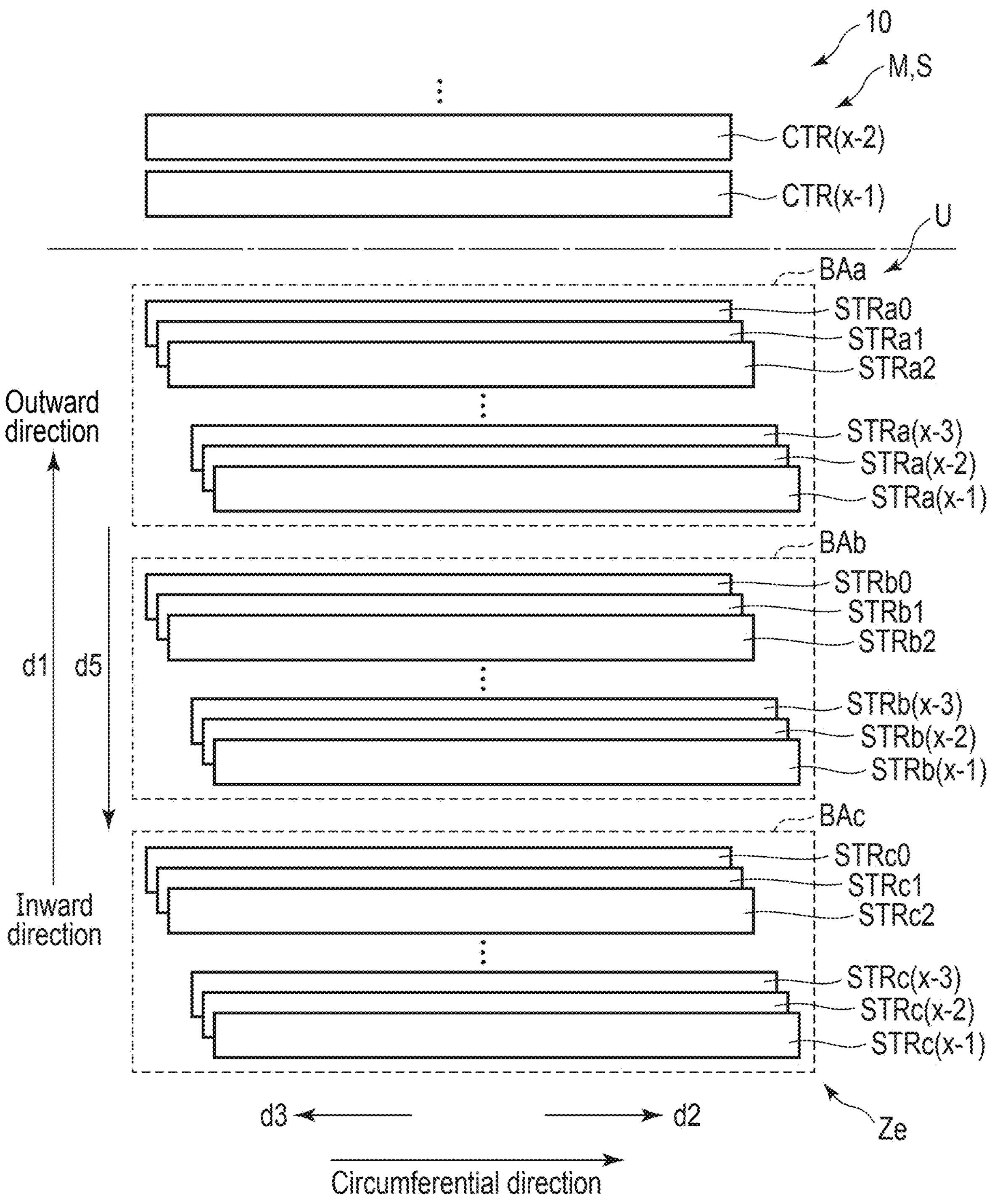
FIG. 6 is a schematic diagram showing an example of a process of data write to the disk.

FIG. 6 is a schematic view showing an example of the data write processing for the disk DK. The tracks STR and CTR are each a data track. As shown in FIG. 6, the user data area U has bands BAa, BAb, and BAc. Bands BAa, BAb, and BAc belong to a same zone Ze. In zone Ze, bands BAa, BAb, and BAc are arranged intermittently in the order in which they are described in the overwrite direction d5.

Bands BAa and BAb are adjacent to each other in the radial direction d1, and bands BAb and BAc are adjacent to each other in the radial direction d1.

Band BAa includes x tracks of tracks STRa0, STRa1, STRa2, . . . , STRa(x−3), STRa(x−2), and STRa(x−1). Shingled magnetic recording is performed on tracks STRa0 to STRa(x−1) in the overwrite direction d5 in the order of their description. In band BAa, track STRa0 corresponds to a first track where data is written first, and track STRa(x−1) corresponds to a last track where data is written last.

Band BAb includes x tracks of tracks STRb0, STRb1, STRb2, . . . , STRb(x−3), STRb(x−2), and STRb(x−1). Shingled magnetic recording is performed on tracks STRb0 to STRb(x−1) in the overwrite direction d5 in the order of their description. In band BAb, track STRb0 corresponds to a first track where data is written first, and track STRb(x−1) corresponds to a last track where data is written last.

Band BAc includes x tracks of tracks STRc0, STRc1, STRc2, . . . , STRc(x−3), STRc(x−2), and STRc(x−1). Shingled magnetic recording is performed on tracks STRc0 to STRc(x−1) in the overwrite direction d5 in the order of their description. In band BAc, track STRc0 corresponds to a first track where data is written first, and track STRc(x−1) corresponds to a last track where data is written last.

The number of tracks STR possessed by each band BA belonging to the same zone Z is the same. For example, the number of tracks STR possessed by each band BA belonging to zone Ze is the same. In other words, the number of tracks STR possessed by each band BA is fixed for each zone Z. In this example, the number of tracks STR possessed by each band BA belonging to zone Ze is x.

FIG. 6 shows tracks CTR(x−2) and CTR(x−1). In FIG. 6, conventional magnetic recording is performed on tracks CTR(x−2) and CTR(x−1) in the media cache M or the system area S. Tracks CTR(x−2) and CTR(x−1) are adjacent to each other in the radial direction d1.

Figure 7:
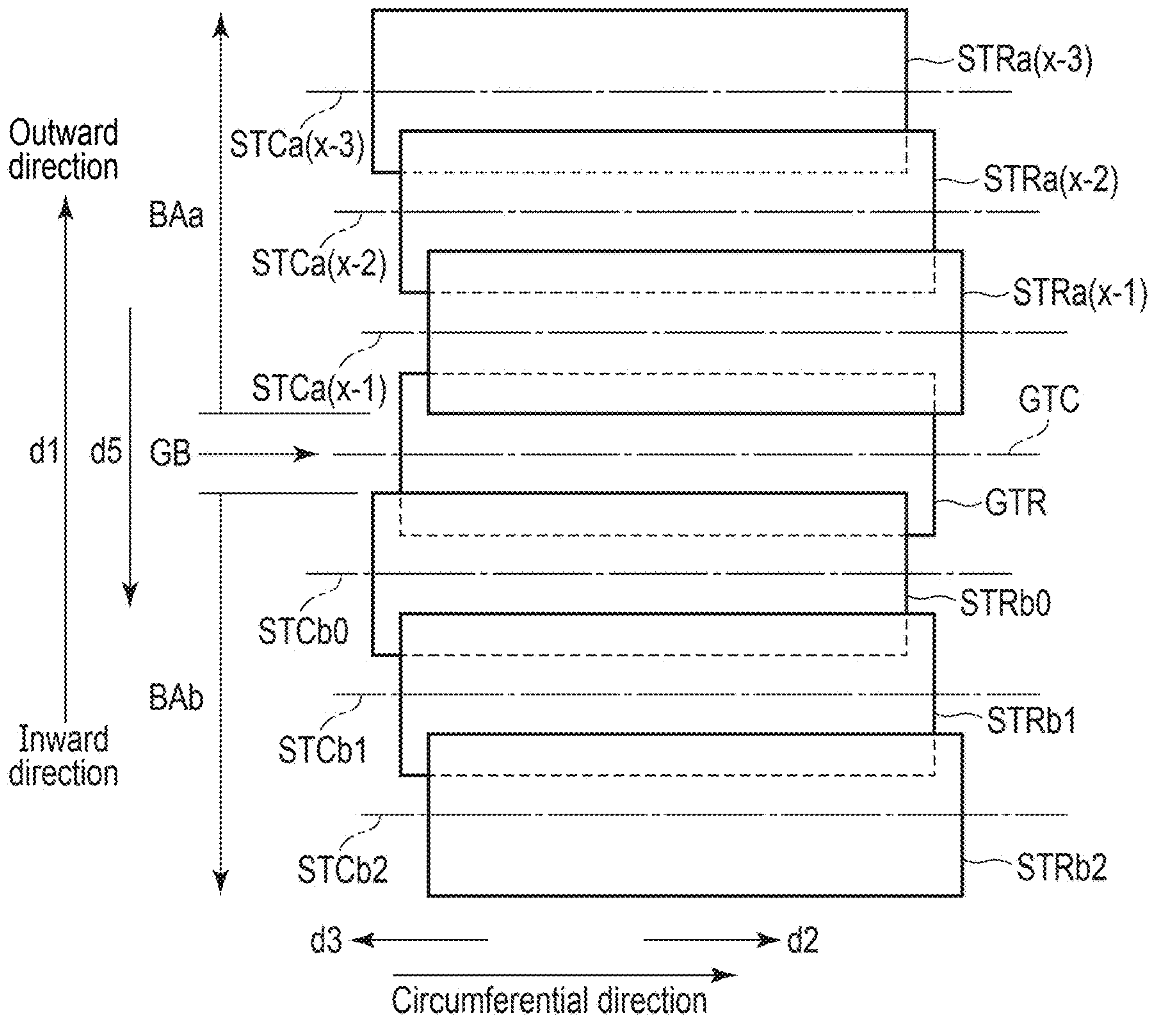
FIG. 7 is a schematic diagram showing two bands and one guard band in the user data area shown in FIG. 6.

FIG. 7 is a schematic view showing two bands BAa and BAb and one guard band GB of the user data area U shown in FIG. 6. As shown in FIG. 7, unlike the conventional magnetic recording method, the shingled magnetic recording method has the characteristic of overwriting part of the track STR, so the MPU 60 manages a track group of the user data area U in units called bands.

A guard band GB is generally provided between bands BA that are adjacent in the radial direction d1. The guard band GB includes a guard track GTR. Unlike this comparative example, the guard band GB may include a plurality of guard tracks GTR. The guard band GB has the role of suppressing interference between adjacent bands BA. The guard band GB makes it possible to perform shingled magnetic recording in units of one band BA. In addition, the guard band GB makes it possible to separate the range (band BA) to be written sequentially.

For example, a track center STCa(x−3) of track STRa(x−3), a track center STCa(x−2) of track STRa(x−2), a track center STCa(x−1) of track STRa(x−1), a track center GTC of guard track GTR, a track center STCb0 of track STRb0, a track center STCb1 of track STRb1, and a track center STCb2 of track STRb2 are located at equal pitch in the overwrite direction d5.

Except for the guard band GB, the recording capacity of each band BA in the user data area U is usually determined in advance based on request specifications from a user. The MPU 60 can record data of the same capacity in each band BA. Generally, the recording capacity of each band BA is 128 MiB or 256 MiB.

Figure 8:
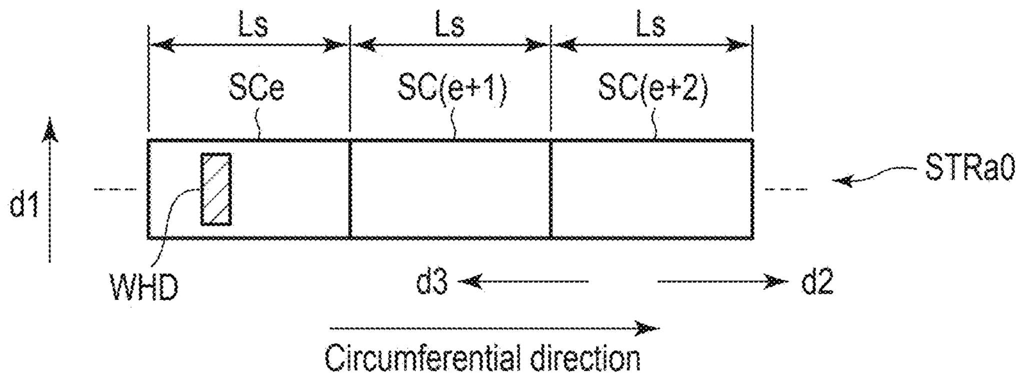
FIG. 8 is a schematic diagram showing three sectors of one track of the band shown in FIG. 6.

FIG. 8 is a schematic view showing three sectors SCe, SC(e+1), and SC(e+2) of one track STRa0 of band BAa shown in FIG. 6. As shown in FIG. 8, each track STR has a plurality of sectors SC arranged in a circumferential direction. Track STRa1 has a plurality of sectors SC, including sectors SCe, SC(e+1), and SC(e+2). The number of sectors SC that each track STR belonging to the same zone Z has is the same. In this comparative example, the number of sectors SC possessed by each track STR belonging to zone Ze is y.

Each sector SC has a length Ls in the circumferential direction of the disk DK. Each sector SC may be a split sector that is divided by a servo sector SV. In this case, the length of the sector SC does not have to be Ls.

The write head WHD is a magnetic head for energy assisted magnetic recording (EAMR). In this comparative example, the write head WHD is configured to utilize energy other than magnetic energy; however, it is not limited thereto, and the write head WHD may be a magnetic head that is not configured to perform energy assisted magnetic recording.

Figure 9:
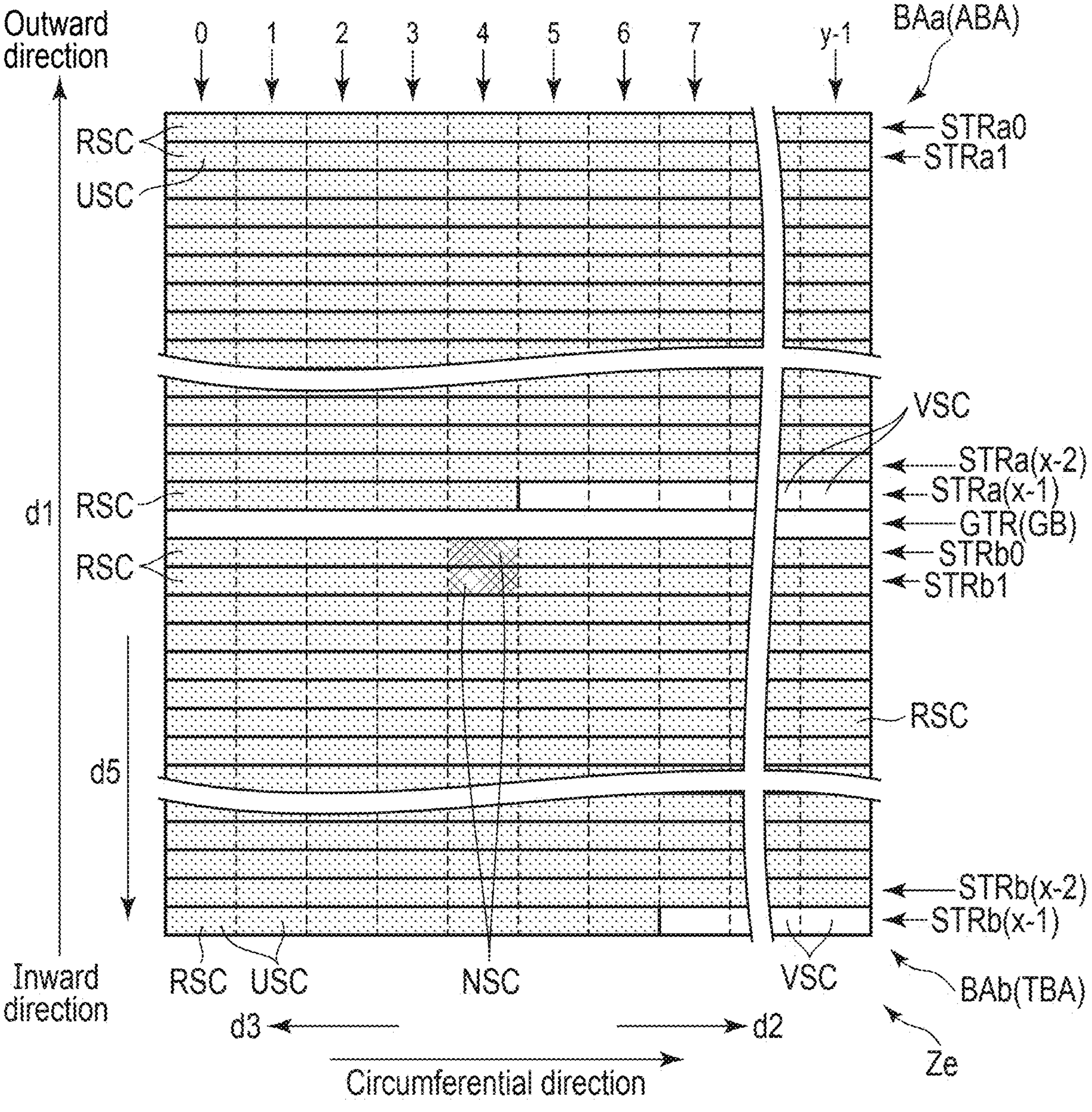
FIG. 9 is a schematic diagram showing one guard band and two bands shown in FIG. 7 and illustrating a plurality of target sectors and a plurality of unused sectors.

FIG. 9 is a schematic view showing the two bands BAa and BAb and one guard band GB shown in FIG. 7, and illustrates a plurality of target sectors RSC and a plurality of unused sectors VSC. In FIG. 9, for convenience of explanation, each track STR is shown as a rectangular shape; however, in reality, each track STR is curved along the circumferential direction. In addition, although the plurality of tracks STR are aligned in the overwrite direction d5 without overlapping, in reality, the plurality of tracks STR are aligned in the overwrite direction d5 while overlapping each other. Furthermore, the target sector RSC is indicated by a dot pattern in the drawing and the non-use sector NSC is indicated by a grid pattern. The unused sector VSC is shown with no pattern.

As shown in FIG. 9, the band number of band BAa is "a" and the band number of band BAb is "b". The track number of each band BA is "0" to "x−1". The sector number of each track STR is "0" to "y−1". In the following, the sector SC of each band BA may be identified using the following code "SC (track number, sector number)".

In this comparative example, band BAa is a band adjacent to band BAb, and is a band located above band BAb in the overwrite direction d5. Each track STR of band BAa contains G target sectors RSC (one or more target sectors RSC) on which valid data is written.

For example, track STRa0 has y target sectors RSC (G=y). All sectors SC of track STRa0 are target sectors RSC. Track STRa(x−1) has five target sectors RSC (G=5). The remaining sectors SC in track STRa(x−1) are unused sectors VSC, in which valid data has not been written. From the above, the number of target sectors RSC of track STRa0 is different from the number of target sectors RSC of track STRa(x−1).

In the band BAb, the sector SC of number 4 is a defective sector and a non-use sector NSC in two tracks STR of number 0 and number 1. The sectors SC from number 0 to number 3 and from number 5 to number y−1 are target sectors RSC and recording sectors USC. All sectors SC of tracks STR from number 2 to number x−2 are target sectors RSC and recording sectors USC. In the track STR of number x−1 of the band BAb, seven sectors SC from number 0 to number 6 are target sectors RSC and recording sectors USC. On the other hand, in the track STR of number x−1 of the band BAb, the remaining sectors SC from number 7 to number y−1 are unused sectors VSC to which no valid data is written.

Figure 10:
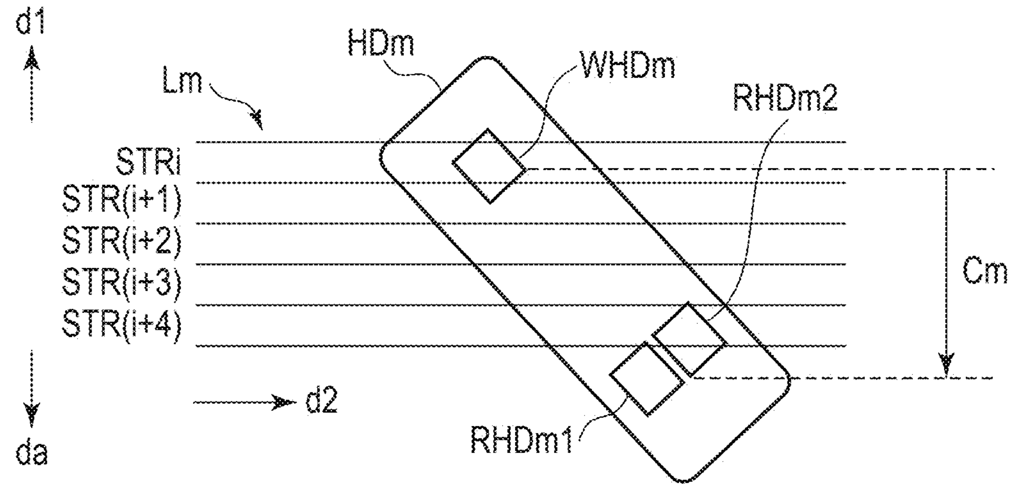
FIG. 10 is a plan view showing part of one recording layer and one head according to the comparative example.

FIG. 10 is a plan view showing part of one recording layer Lm and one head HDm according to the comparative example.

As shown in FIG. 10, the head HDm opposed to the recording layer Lm includes a write head WHDm, a read head RHDm1 and a read head RHDm2. The write head WHDm, read head RHDm1 and read head RHDm2 are supported by the same arm 30.

Assume that during a period in which data is written to the track STRi of the recording layer Lm using the write head WHDm, a first offset amount that is a distance from the write head WHDm to the read head RHDm1 in the first direction da is Cm. When data is written to the track STRi using the write head WHDm, the write processing unit 62 offsets the read head RHDm1 by Cm from the position of the track STRi in the first direction da and opposes the write head WHDm to the track STRi to write user data to the track STRi using the write head WHDm.

Note that the first offset amount Cm depends on a Yaw angle that is a tilt angle of the head HDm with respect to the circumferential direction of the recording layer Lm. The first offset amount Cm may be common to each band BA or to each zone Z.

Figure 11:
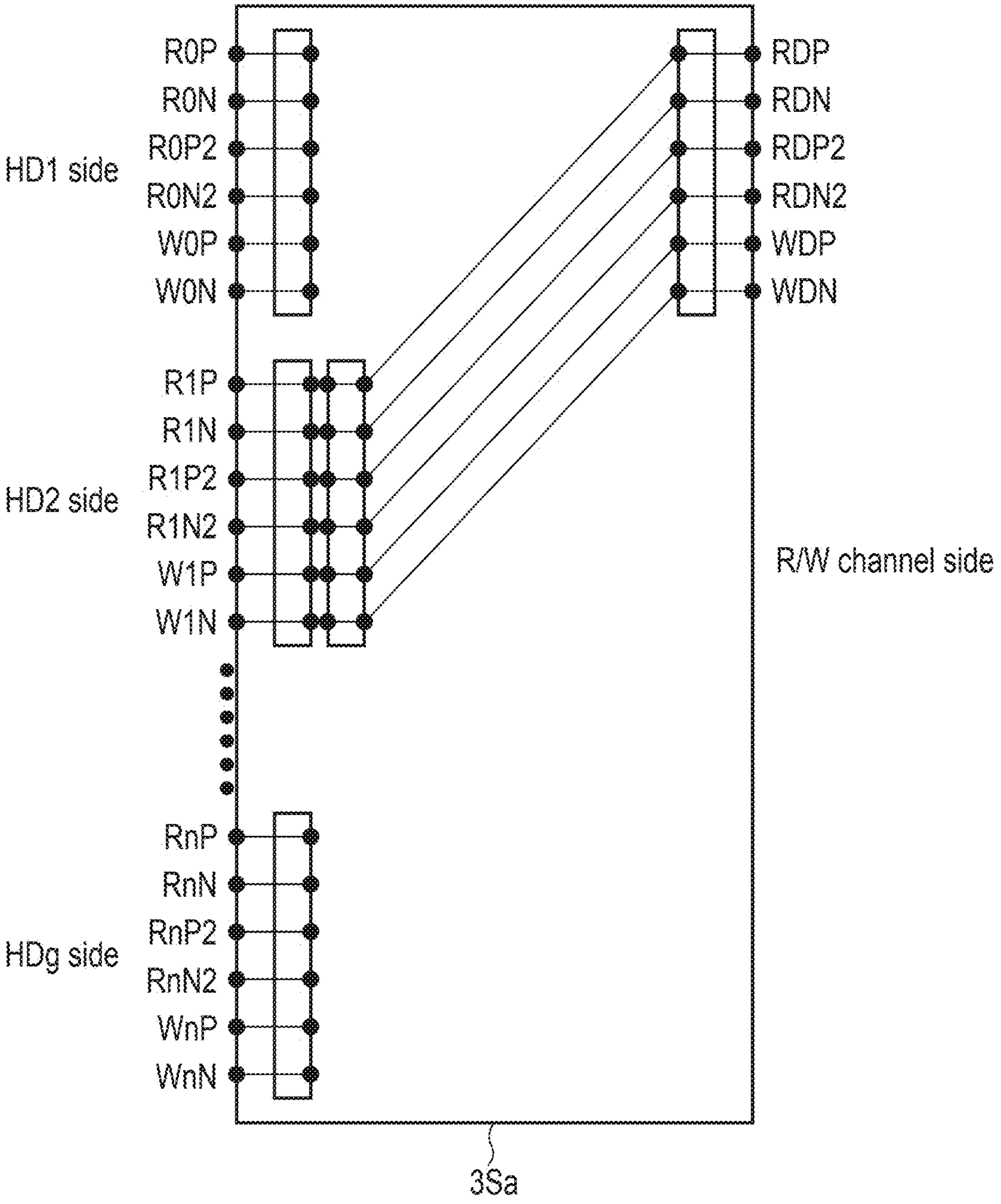
FIG. 11 is a circuit diagram showing a selector circuit of a head amplifier IC according to the comparative example.

FIG. 11 is a circuit diagram showing the selector circuit 3Sa of the head amplifier IC 130 according to the comparative example.

As shown in FIG. 11, the selector circuit 3Sa is a multiplexer to receives a number of signals and transmit six signals. The heads HD to which the selector circuit 3Sa can be connected at a time are one of the heads HD1 to HDg. In this example, the selector circuit 3Sa is connected to the head HD2.

Of the terminals located alongside the head HD2 of the selector circuit 3Sa, positive and negative terminals R1P and R1N are connected to a read head RHD21 of the head HD2. The positive and negative terminals R1P2 and R1N2 are connected to a read head RHD22 of the head HD2. The positive and negative terminals W1P and W1N are connected to a write head WHD2 of the head HD2.

Of the terminals located alongside the R/W channel 140 of the selector circuit 3Sa, the positive and negative terminals RDP and RDN are connected to a read amplifier 3R1. The positive and negative terminals RDP2 and RDN2 are connected to a read amplifier 3R2. The positive and negative terminals WDP and WDN are connected to a write driver 3W.

The read signals output from the read head RHD are operation signals and paired signals. The write head WHD operates on the operation signals, and the write signals input to the write head WHD are paired signals. Utilizing the operation signals makes it possible to transfer a signal at high speed without noise. Here is reference to the operation signals for description of a difference between the levels of positive and negative signals. In the following description, however, paired signals output from the read head RHD may collectively be referred to as a read signal, and paired signals input to the write head WHD may collectively be referred to as a write signal.

Figure 12:
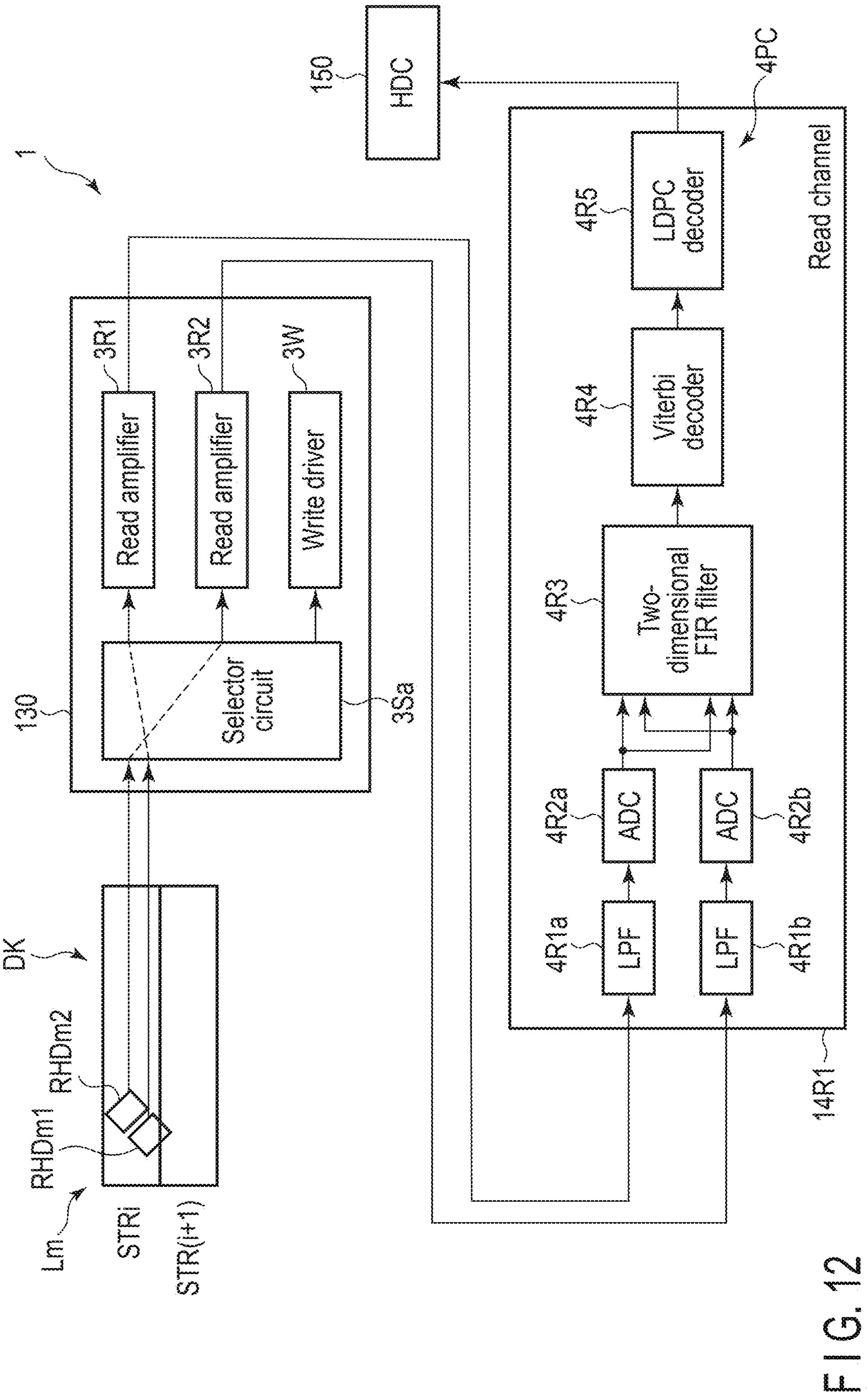

FIG. 12 is a block diagram showing a configuration of part of the magnetic disk device 1 according to the comparative example and also showing a configuration of a read channel 14R1 and the like.

As shown in FIG. 12, a read channel 14R1 of the R/W channel 140 is connected to the head amplifier IC 130 and includes a processing circuit 4PC for two dimensional magnetic recording (TDMR). The processing circuit 4PC includes low pass filters (LPF) 4R1*a* and 4R1*b*, analog to digital converters (ADC) 4R2*a* and 4R2*b*, a two-dimensional finite impulse response (FIR) filter 4R3, a Viterbi decoder 4R4, and a low density parity check (LDPC) decoder 4R5.

The recording layer Lm has a track STRi. The write processing unit 62 can write user data to the track STRi using the write head WHDm.

The LPF 4R1*a* is connected to the read head RHDm1 of the head HDm via the read amplifier 3R1 of the head amplifier IC 130. The LPF 4R1*a* can remove noise contained in the first read signal read by the read head RHDm1 and amplified by the read amplifier 3R1. The ADC 4R2*a* is connected to the LPF 4R1*a* to allow the first read signal to be converted into a digital signal.

The LPF 4R1*b* is connected to the read head RHDm2 of the head HDm via the read amplifier 3R2 of the head amplifier IC 130. The LPF 4R1*b* can remove noise contained in the second read signal read by the read head RHDm2 and amplified by the read amplifier 3R2. The ADC 4R2*b* is connected to the LPF 4R1*b* to allow the second read signal to be converted into a digital signal.

The two-dimensional FIR filter 4R3 is connected to the ADCs 4R2*a* and 4R2*b*. The two-dimensional FIR filter 4R3 can perform a waveform equalization process to equalize the waveform of combined data obtained by combining a first read signal read by the read head RHDm1 and a second read signal read by the read head RHDm2 so as to minimize the error rate (BER) of data written to the track STRi, and thus output waveform equalization data as a result of the waveform equalization process on the combined data.

The Viterbi decoder 4R4 is connected to the two-dimensional FIR filter 4R3. The Viterbi decoder 4R4 is supplied with waveform equalization data. The Viterbi decoder 4R4 can output decoded data obtained by decoding the waveform equalized data. The internal arithmetic operation of the Viterbi decoder 4R4 can be performed by an algorithm in which the track STRi is considered. The average signal value, noise variance value and tap coefficient of a noise whitening filter in the metric calculation of the Viterbi decoder 4R4 are held for each path metric in which the track STRi is considered, and are optimized so as to minimize the BER of the track STRi.

The LDPC decoder 4R5 is connected to the Viterbi decoder 4R4. The LDPC decoder 4R5 can perform a process of decoding an LDPC code for the decoded data input from the Viterbi decoder 4R4.

When the read target selection unit 64 selects the track STRi of the recording layer Lm, the read processing unit 63 drives the actuator (VCM 24) to control a seek operation to seek the head HDm (read heads RHDm1 and RHDm2) and move the read heads RHDm1 and RHDm2 to positions opposed to the track STRi. Then, the read processing unit 63 controls driving of the selector circuit 3Sa, causes the selector circuit 3Sa to select the head HDm (read heads RHDm1 and RHDm2), and independently reads user data of the track STRi through the selector circuit 3Sa.

The processing circuit 4PC can combine and process the signal read by the read head RHDm1 and the signal read by the read head RHDm2, and output a combined processing signal whose noise components are reduced.

According to the magnetic disk device 1 according to the comparative example configured as described above, data of one track STRi can be read using two read heads RHDm1 and RHDm2. It is thus possible to obtain high-quality data whose noise is reduced. The number of heads HD to which the selector circuit 3Sa can be connected at a time is one. Therefore, in order to detect a defect that may exist on the recording layer L, the selector circuit 3Sa can select one head HD and the detection unit 65 can detect (inspect) whether a defect exists on one recording layer L. The management unit 66 can manage information of an area in the recording layer L where a defect exists.

However, in order to shorten the time required for detecting a defect, it is preferable that the selector circuit 3Sa simultaneously selects two or more heads HD and simultaneously detects (inspects) whether or not a defect exists in two or more recording layers L.

Embodiment

Figure 13:
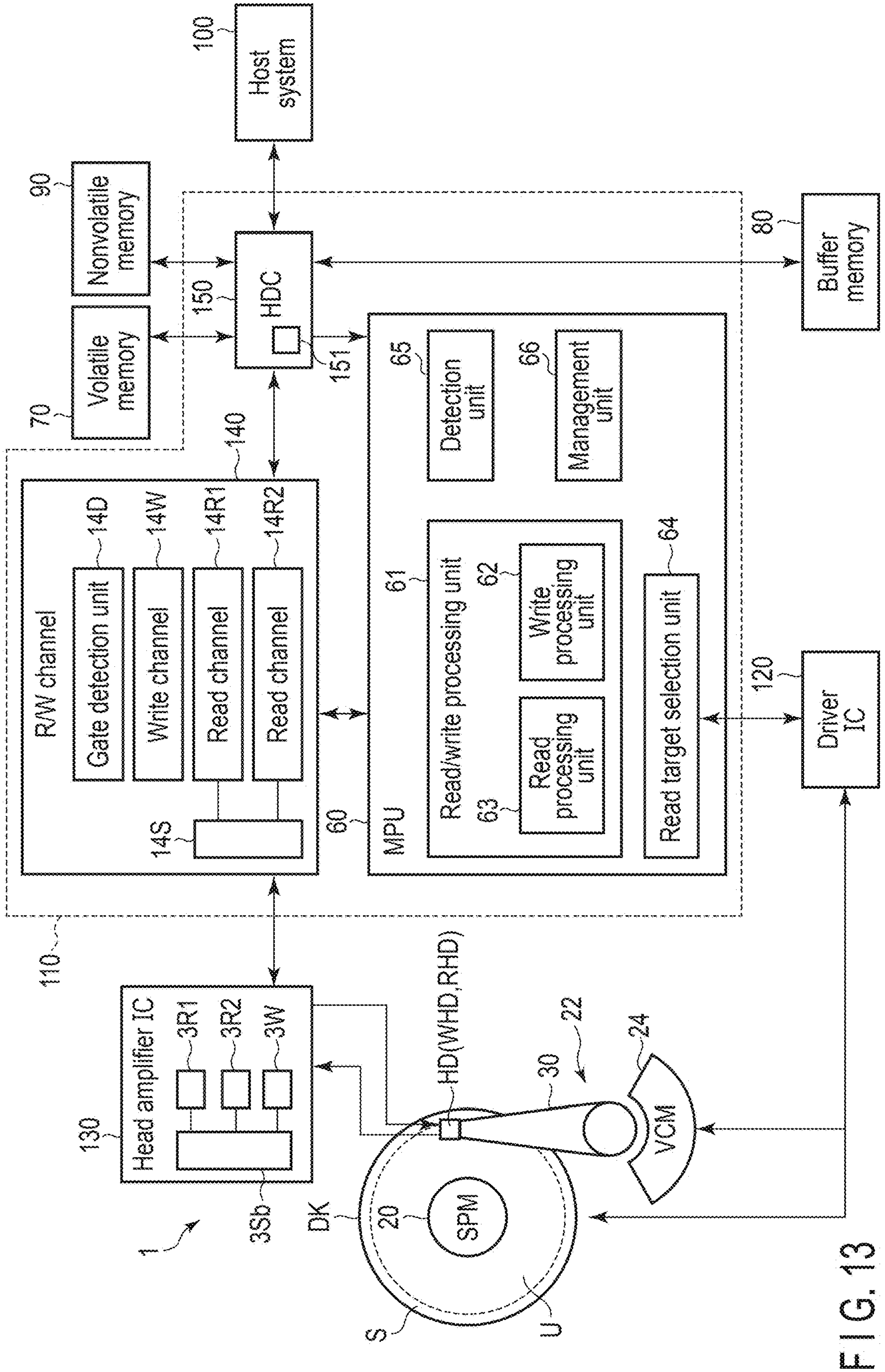
FIG. 13 is a block diagram showing a configuration of a magnetic disk device according to an embodiment.

Next, a description of the configuration of a magnetic disk device 1 according to an embodiment will be provided. FIG. 13 is a block diagram of the configuration of the magnetic disk device 1 according to the embodiment. The magnetic disk device 1 is configured in the same manner as the magnetic disk device 1 of the foregoing comparative example, except for the configuration to be described below.

As shown in FIG. 13, the head amplifier IC 130 includes a selector circuit 3Sb instead of the selector circuit 3Sa. The R/W channel 140 further includes a read channel 14R2 and a selector circuit 14S. Although the selector circuit 3Sb will be described in detail later, it is connected to a plurality of read heads RHD and can select two or more of the read heads RHD.

The R/W channel 140 includes a read channel 14R1. If the selector circuit 14S selects the read channel 14R1, the magnetic disk device 1 can utilize the TDMR as in the comparative example described above to process two different signals taken in simultaneously from the same data track (same data sector) and read data.

Figure 14:
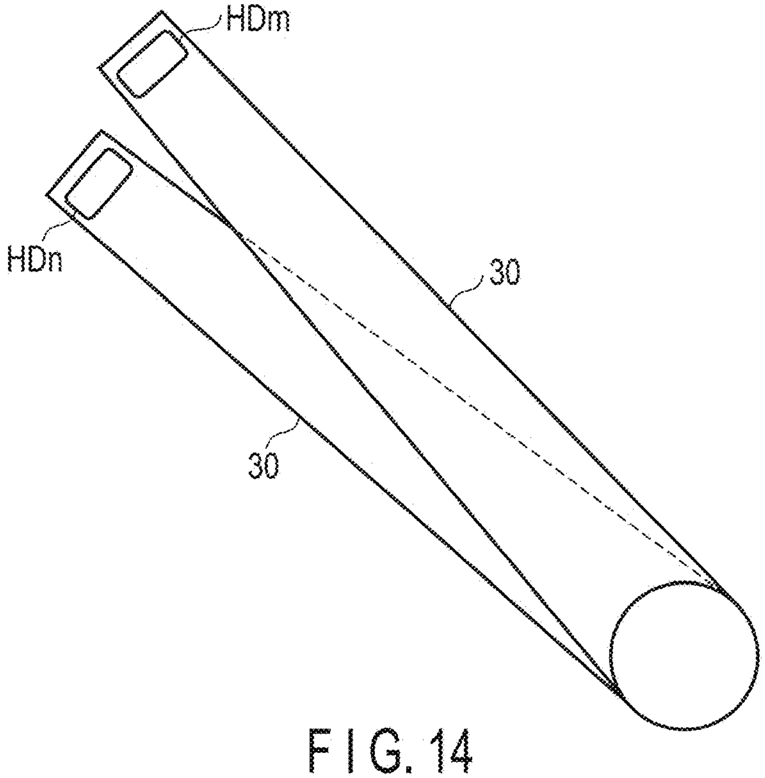
FIG. 14 is a plan view showing a plurality of arms and a plurality of heads according to the embodiment.

FIG. 14 is a plan view showing a plurality of arms 30 and a plurality of heads HD according to the present embodiment. In FIG. 14, attention is focused on two arms 30 and two heads HDm and HDn.

As shown in FIG. 14, the heads HDm and HDn are supported by their respective arms 30. The actuator (VCM 24) can control the operation of the arms 30 and move the arms 30 uniformly.

Pay attention here to the positional relationship between the heads HDm and HDn. The heads HDm and HDn overlap in a direction along the axis of rotation of the disk DK. However, the heads HDm and HDn may not overlap in the direction along the axis of rotation of the disk DK and, in this case, the heads HDm and HDn may be displaced in the radial direction d1 of the disk DK. In addition, the heads HDm and HDn may be displaced in the circumferential direction of the disk DK.

Figure 15:
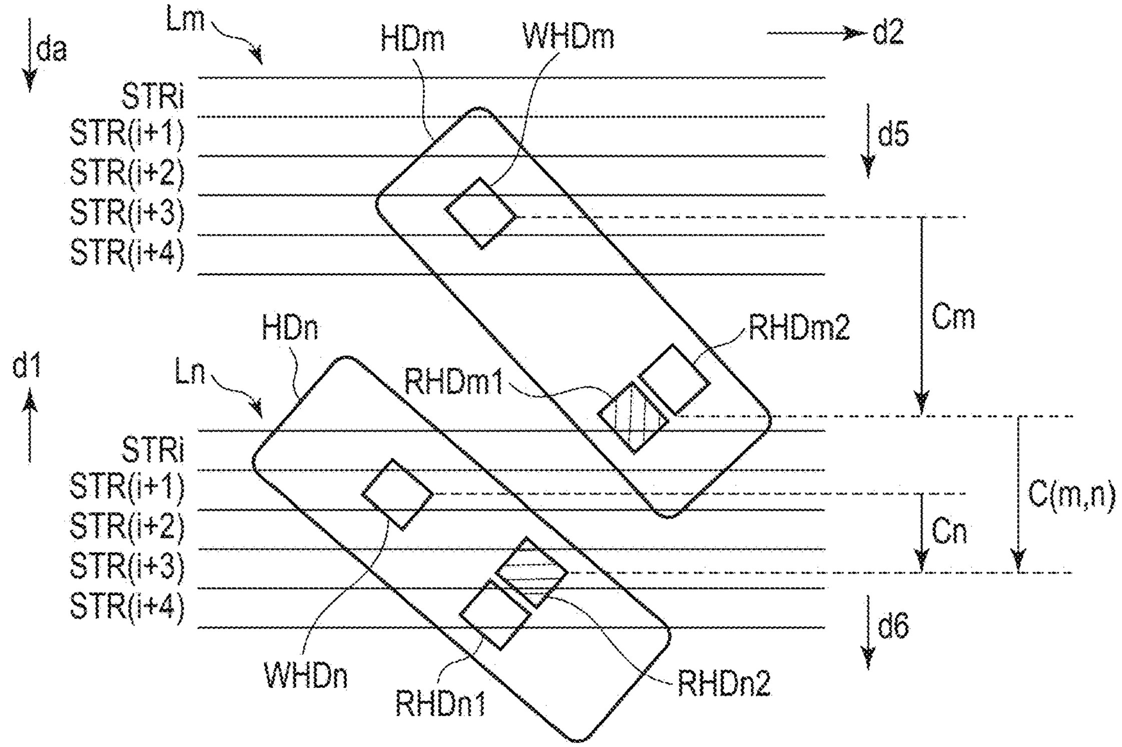
FIG. 15 is a plan view showing part of each of two recording layers and two heads according to the embodiment and illustrating the positional relationship between two recording layers and two heads in the radial direction.

FIG. 15 is a plan view showing part of each of two recording layers Lm and Ln and two heads HDm and HDn according to the present embodiment, and illustrating the positional relationship between the two recording layers Lm and Ln and the two heads HDm and HDn in the radial direction d1.

As shown in FIG. 15, a plurality of recording layers L include recording layers Lm and Ln. The track STRi of the recording layer Lm and the track STRi of the recording layer Ln overlap in a direction along the axis of rotation of the disk DK. However, as shown in FIG. 15, the tracks STRi of the recording layers Lm and Ln may be displaced in the radial direction d1.

A plurality of write heads WHD include a write head WHDm that writes data to the recording layer Lm and a write head WHDn that writes data to the recording layer Ln.

The write processing unit 62 can select shingled magnetic recording (SMR) in which data of a track STR(i+3) of the recording layer Lm is overwritten to, for example, data of a track STR(i+2) thereof in an overwrite direction d5 parallel to the radial direction d1. The write processing unit 62 can also select shingled magnetic recording (SMR) in which data of a track STR(i) of the recording layer Ln is overwritten to, for example, data of a track STRi thereof in an overwrite direction d6 parallel to the radial direction d1.

In the example of FIG. 15, the overwrite directions d5 and d6 coincide with each other, but may be opposite to each other.

A plurality of read heads RHD include read heads RHDm1 and RHDm2 that read data from the recording layer Lm and read heads RHDn1 and RHDn2 that read data from the recording layer Ln.

The head HDm includes a write head WHDm, a read head RHDm1 and a read head RHDm2. The head HDn includes a write head WHDn, a read head RHDn1 and a read head RHDn2.

During a period in which data is written to the track STR(i+3) of the recording layer Lm using the write head WHDm, a first offset amount that is the distance from the write head WHDm to the read head RHDm1 in the first direction da is defined as Cm, a second offset amount that is the distance from the write head WHDn to the read head RHDn2 in the first direction da is defined as Cn, and a third offset amount that is the distance from the read head RHDm1 to the read head RHDn2 in the first direction da is defined as C(m, n).

The first offset amount Cm, second offset amount Cn and third offset amount C(m, n) each depend on the Yaw angle, and may be common in the band BA unit or common in the zone Z unit.

Figure 16:
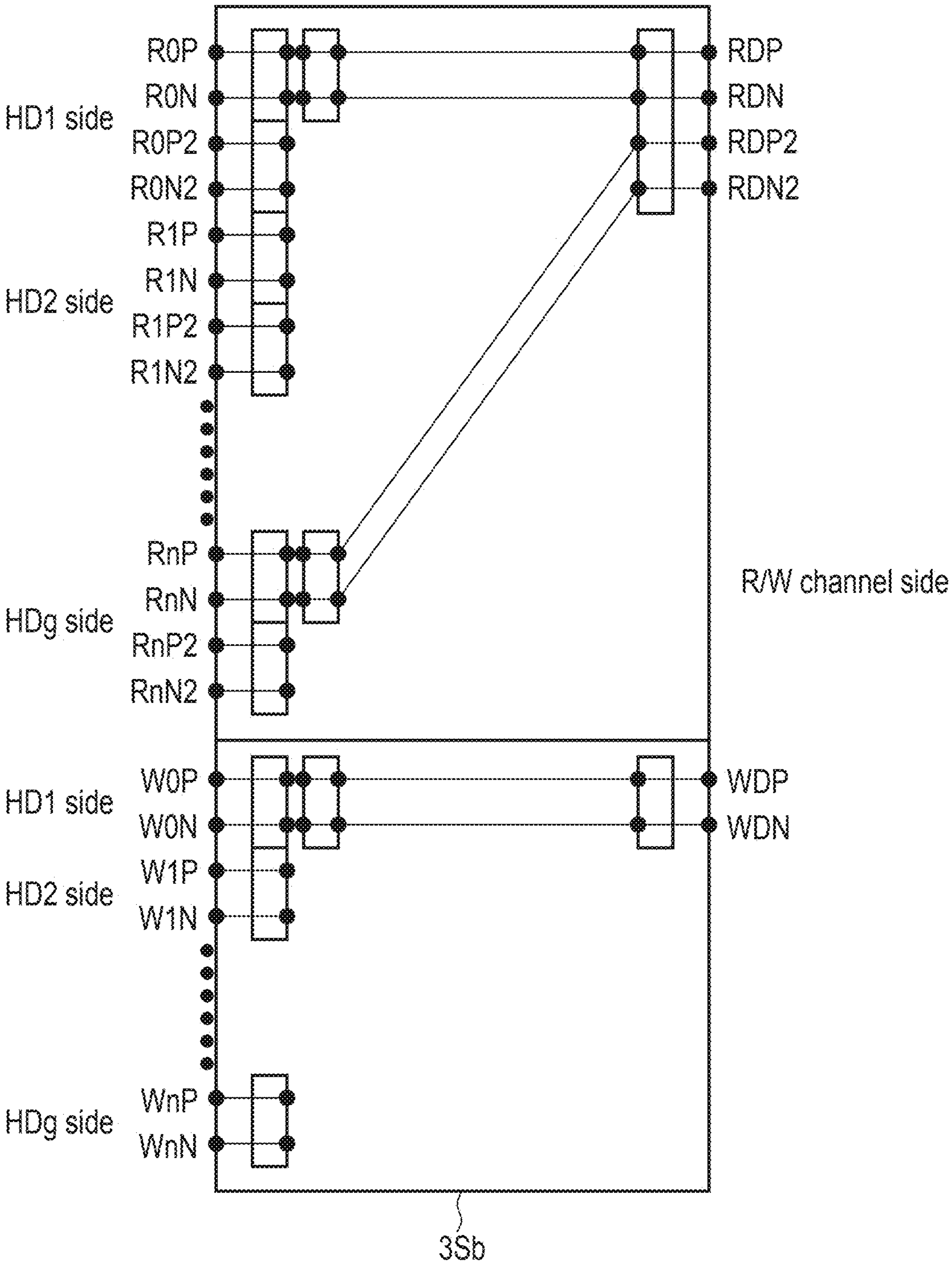
FIG. 16 is a circuit diagram showing a selector circuit of a head amplifier IC according to the embodiment.

FIG. 16 is a circuit diagram showing the selector circuit 3Sb of the head amplifier IC 130 according to the present embodiment.

As shown in FIG. 16, the selector circuit 3Sb is a multiplexer which receives a number of signals and outputs six signals. The selector circuit 3Sb is connected to a plurality of read heads RHD. The selector circuit 3Sb can freely select two or more of the read heads RHD. Thus, the number of heads HD to which the selector circuit 3Sb can be connected at a time is two or more of the heads HD1 to HDg. In this example, the selector circuit 3Sb is connected to the heads HD1 and HDg.

Of the terminals alongside the head HD1 of the selector circuit 3Sb, a positive terminal R0P and a negative terminal R0N are connected to the read head RHD11 of the head HD1.

Of the terminals alongside the head HDg of the selector circuit 3Sb, a positive terminal RnP and a negative terminal RnN are connected to the read head RHDg1 of the head HDg.

Of the terminals alongside the head HD1 of the selector circuit 3Sb, a positive terminal W0P and a negative terminal W0N are connected to the write head WHD1 of the head HD1.

Of the terminals alongside the R/W channel 140 of the selector circuit 3Sb, a positive terminal RDP and a negative terminal RDN are connected to the read amplifier 3R1. The positive terminal RDP2 and negative terminal RDN2 are connected to the read amplifier 3R2. The positive terminal WDP and negative terminal WDN are connected to the write driver 3W.

In the present embodiment, too, a signal taken out of the read head RHD and a signal taken into the write head WHD are operation signals. However, in the following description, a pair of signals taken out of the read head RHD may collectively be referred to as a read signal, and a pair of signals taken into the write head WHD may collectively be referred to as a write signal.

Figure 17:
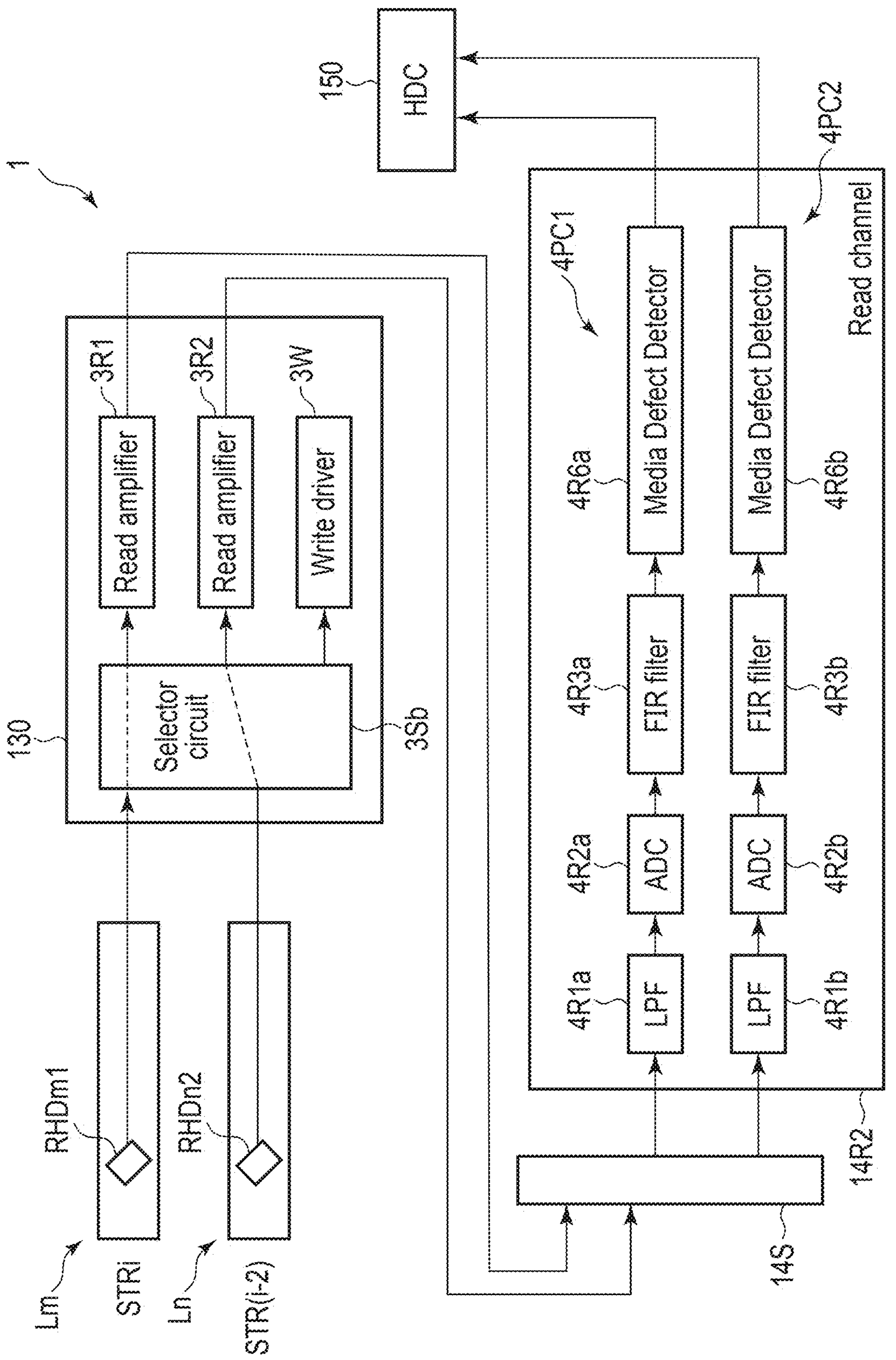
FIG. 17 is a block diagram showing a configuration of part of the magnetic disk device according to the embodiment and also showing a configuration of a read channel different from the read channel shown in FIG. 12.

FIG. 17 is a block diagram showing a configuration of part of the magnetic disk device 1 according to the present embodiment, and also showing a configuration of a read channel 14R2 other than the read channel 14R1 shown in FIG. 12.

As shown in FIGS. 17 and 13, when the read target selection unit 64 selects the recording layers Lm and Ln, the read processing unit 63 can control driving of the selector circuit 3Sb, cause the selector circuit 3Sb to select the read heads RHDm1 and RHDn2, and read data of the recording layer Lm and data of the recording layer Ln simultaneously through the selector circuit 3Sb. Here, data of the track STRi of the recording layer Lm and data of the track STR(i−2) of the recording layer Ln can be read simultaneously. The detection unit 65 can detect the state of the recording layer Lm (track STRi of the recording layer Lm) and the state of the recording layer Ln (track STR(i−2) of the recording layer Ln) based on the signal read by the read head RHDm1 and the signal read by the read head RHDn2.

Since the states of two recording layers L can be detected simultaneously, the magnetic disk device 1 can efficiently detect a defect on the disk DK. If the defect detection mentioned above is applied at the time of manufacturing the magnetic disk device 1, test time for detecting defects can be shortened, with the result that the manufacturing time can be shortened and the manufacturing cost can be reduced.

In addition, when the states of two recording layers L are detected simultaneously, the read processing unit 63 controls driving of the selector circuit 14S and causes the selector circuit 14S to select the read channel 14R2.

The read channel 14R2 includes a plurality of processing circuits. In the present embodiment, the read channel 14R2 includes a first processing circuit 4PC1 and a second processing circuit 4PC2. When the read target selection unit 64 selects the recording layers Lm and Ln, the first processing circuit 4PC1 processes the signal read by the read head RHDm1 and outputs a first processing signal whose noise component is reduced, and the second processing circuit 4PC2 processes the signal read by the read head RHDn2 and outputs a second processing signal whose noise component is reduced. The detection unit 65 can detect the state of the recording layer Lm and the state of the recording layer Ln based on the first processing signal and the second processing signal.

The first processing circuit 4PC1 includes an LPF 4R1*a*, an ADC 4R2*a*, an FIR filter 4R3*a* and a defect detection circuit 4R6*a*.

The LPF 4R1*a* is connected to the read head RHDm1 of the head HDm via the selector circuit 14S and the read amplifier 3R1 and selector circuit 3Sb of the head amplifier IC 130. The LPF 4R1*a* can remove noise from the first read signal read by the read head RHDm1 and amplified by the read amplifier 3R1. The ADC 4R2*a* is connected to the LPF 4R1*a* to convert the first read signal into a digital signal.

The FIR filter 4R3*a* is connected to the ADC 4R2*a*. The FIR filter 4R3*a* is a one-dimensional FIR filter. The FIR filter 4R3*a* can perform a waveform equalization process of equalizing the waveform of the first read signal so as to minimize the error rate of the first read signal. The FIR filter 4R3*a* can output first waveform equalization data.

Based on the data supplied from the FIR filter 4R3*a*, the defect detection circuit 4R6*a* can output, as a first processing signal, information indicating the presence or absence of a defect in the track STRi (data sector) of the recording layer Lm and the range of the defect.

The second processing circuit 4PC2 includes an LPF 4R1*b*, an ADC 4R2*b*, an FIR filter 4R3*b* and a defect detection circuit 4R6*b*.

The LPF 4R1*b* is connected to the read head RHDn2 of the head HDn via the selector circuit 14S and the read amplifier 3R2 and selector circuit 3Sb of the head amplifier IC 130. The LPF 4R1*b* can remove noise from the second read signal read by the read head RHDn2 and amplified by the read amplifier 3R2. The ADC 4R2*b* is connected to the LPF 4R1*b* to convert the second read signal into a digital signal.

The FIR filter 4R3*b* is connected to the ADC 4R2*b*. The FIR filter 4R3*b* is a one-dimensional FIR filter. The FIR filter 4R3*b* can perform a waveform equalization process of equalizing the waveform of the second read signal so as to minimize the error rate of the second read signal. The FIR filter 4R3*b* can output second waveform equalization data.

Based on the data supplied from the FIR filter 4R3*b*, the defect detection circuit 4R6*b* can output, as a second processing signal, information indicating the presence or absence of a defect in the track STR(i−2) (data sector) of the recording layer Ln and the range of the defect. Thus, based on the first and second processing signals, the detection unit 65 can simultaneously detect the state of the track STRi of the recording layer Lm and the state of the track STR(i−2) of the recording layer Ln.

Note that when the state of the recording layer L is detected using the read channel 14R2 and the like, the data written to the recording layer L is different from the user data. The data of the recording layer Lm, the data of the recording layer Ln, and the like are bit data whose code arrangement is simplified compared with the user data. For example, the code arrangement includes codes regularly arranged, such as 0, 1, 0, 1, . . . . Reading the simplified bit data makes it possible to detect the state of the recording layer L and configure the read channel 14R2 easily.

When the detection unit 65 detects a defect in the recording layer Lm, the management unit 66 manages information on an area of the recording layer Lm where the defect exists, determines one or more sectors SC located in the area where the defect exists as abnormal sectors, and exclude the abnormal sectors from the target of the write process and the read process.

For example, if the detection unit 65 and the like detects the state of the zone Ze in FIG. 9, the management unit 66 can determine the sector SC(STRb0, 4) and sector SC(STRb1, 4) of the band BAb as abnormal sectors. Thus, the sector SC(STRb0, 4) and sector SC(STRb1, 4) of the band BAb can be treated as non-use sectors NSC.

Figure 18A:
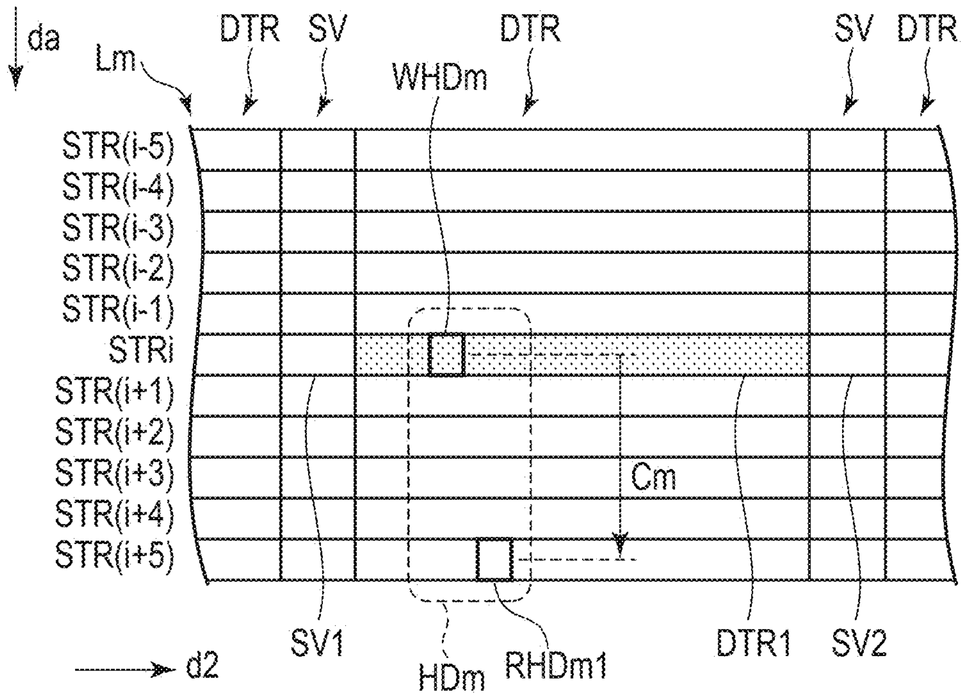
FIG. 18A is a plan view showing part of one recording layer and one head according to the embodiment and also showing a write process of writing data to one data track of one recording layer using one write head.
Figure 18B:
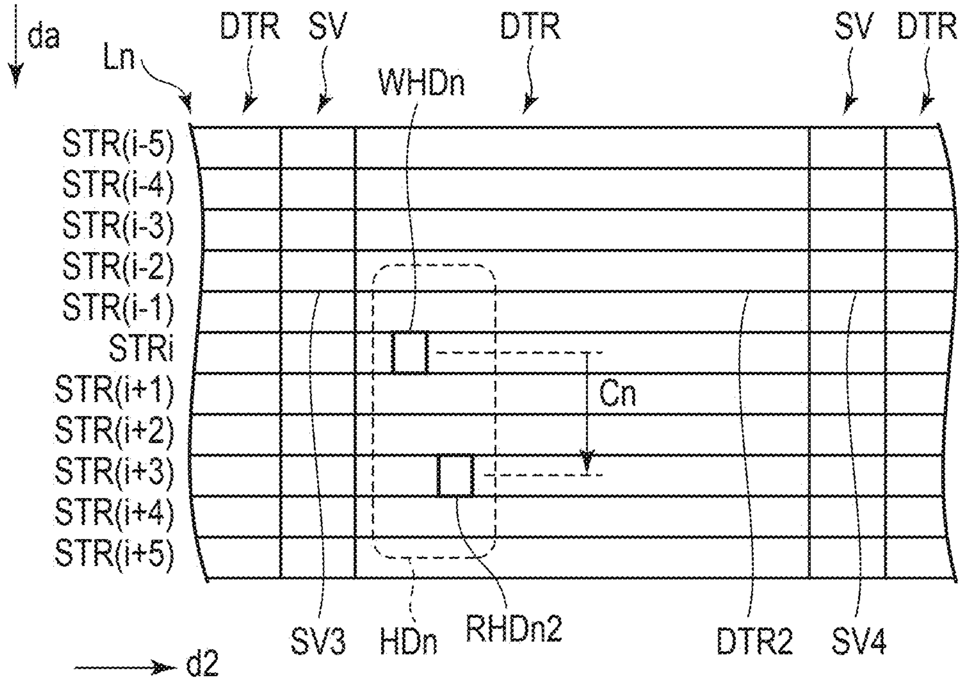
FIG. 18B is a plan view showing part of another recording layer and another head according to the embodiment and also showing the positional relationship between the other recording layer and the other head during a period of the write process shown in FIG. 18A.

Next, a description of the write process of the write processing unit 62 will be provided. FIG. 18A is a plan view showing part of one recording layer Lm and one head HDm according to the present embodiment and showing a write process of writing data to one track STRi of the recording layer Lm using one write head WHDm. FIG. 18B is a plan view showing part of another recording layer Ln and another head HDn according to the present embodiment and showing the positional relationship between the recording layer Ln and the head HDn during a period of the write process of FIG. 18A.

As shown in FIGS. 18A and 18B, the read head RHDm1 is opposed to the track STR(i+5) and accordingly the write head WHDm is opposed to the track STRi. The write processing unit 62 can use the write head WHDm to write data to the track STRi.

Focusing on the positional relationship between the recording layer Ln and the head HDn during a period in which data is written to the track STRi of the recording layer Lm, the read head RHDn2 is opposed to the track STR(i+3) and the write head WHDn is opposed to the track STRi.

Figure 19A:
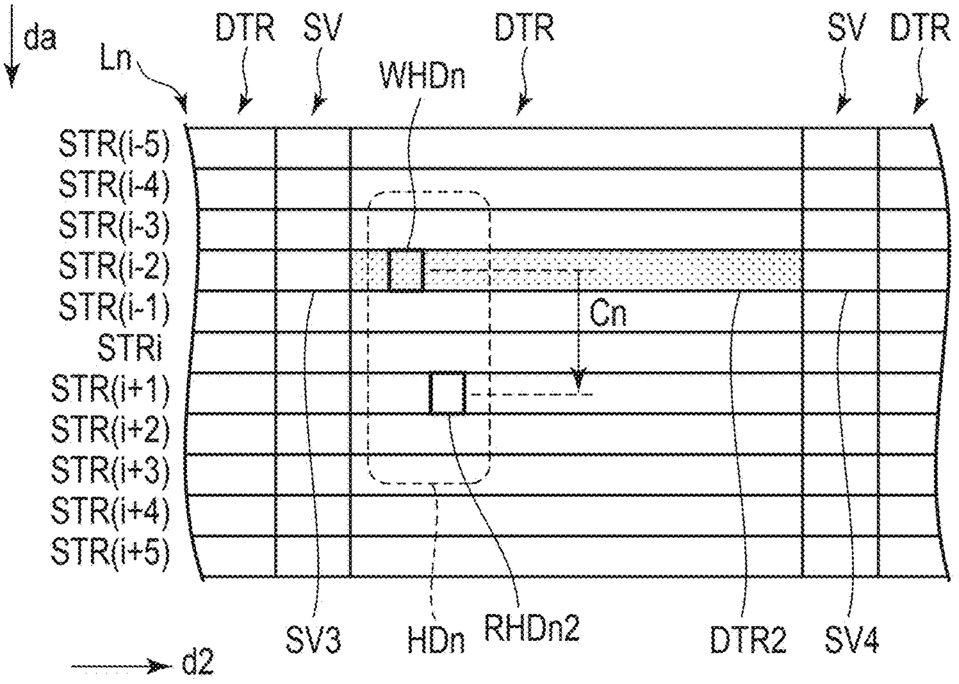
FIG. 19A is a plan view showing part of the other recording layer and the other head according to the embodiment and also showing a write process of writing data to another data track of the other recording layer using another write head.
Figure 19B:
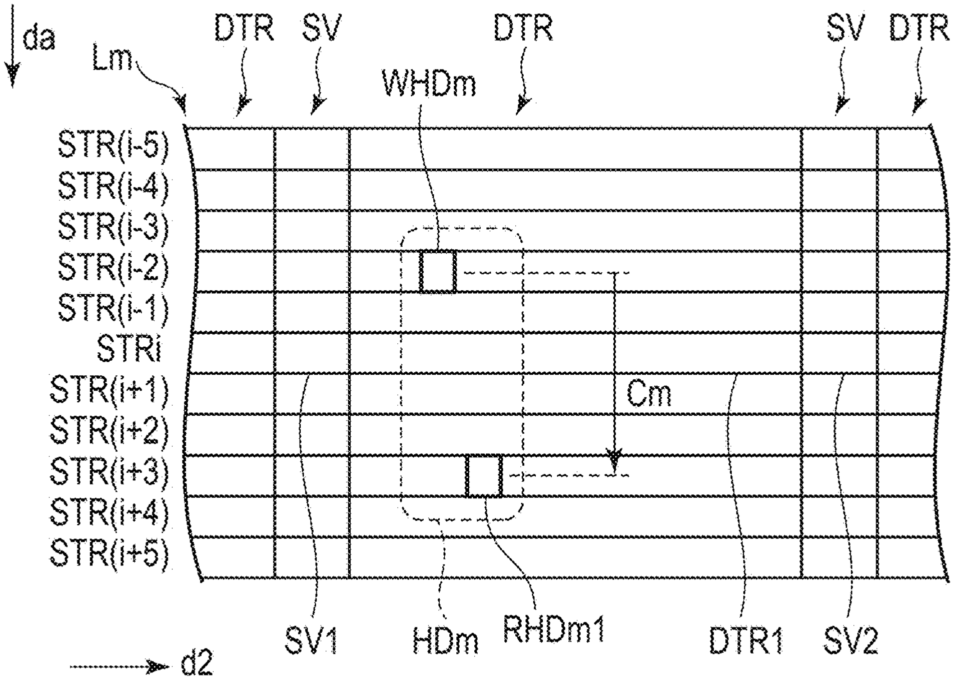
FIG. 19B is a plan view showing part of the one recording layer and the one head according to the embodiment and also showing the positional relationship between the one recording layer and the one head during a period of the write process shown in FIG. 19A.

FIG. 19A is a plan view showing part of the recording layer Ln and the head HDn according to the present embodiment and showing a write process of writing data to the track STR(i−2) of the recording layer Ln using the write head WHDn. FIG. 19B is a plan view showing part of the recording layer Lm and the head HDm according to the present embodiment and showing the positional relationship between the recording layer Lm and the head HDm during a period of the write process of FIG. 19A.

As shown in FIGS. 19A and 19B, the read head RHDn2 is opposed to the track STR(i+1) and accordingly the write head WHDn is opposed to the track STR(i−2). The write processing unit 62 can use the write head WHDn to write data to the track STR(i−2).

Focusing on the positional relationship between the recording layer Lm and the head HDm during a period in which data is written to the track STR(i−2) of the recording layer Ln, the read head RHDm1 is opposed to the track STR(i+3) and the write head WHDm is opposed to the track STR(i−2).

Next, a description of the read process of the read processing unit 63 will be provided.

Figure 20A:
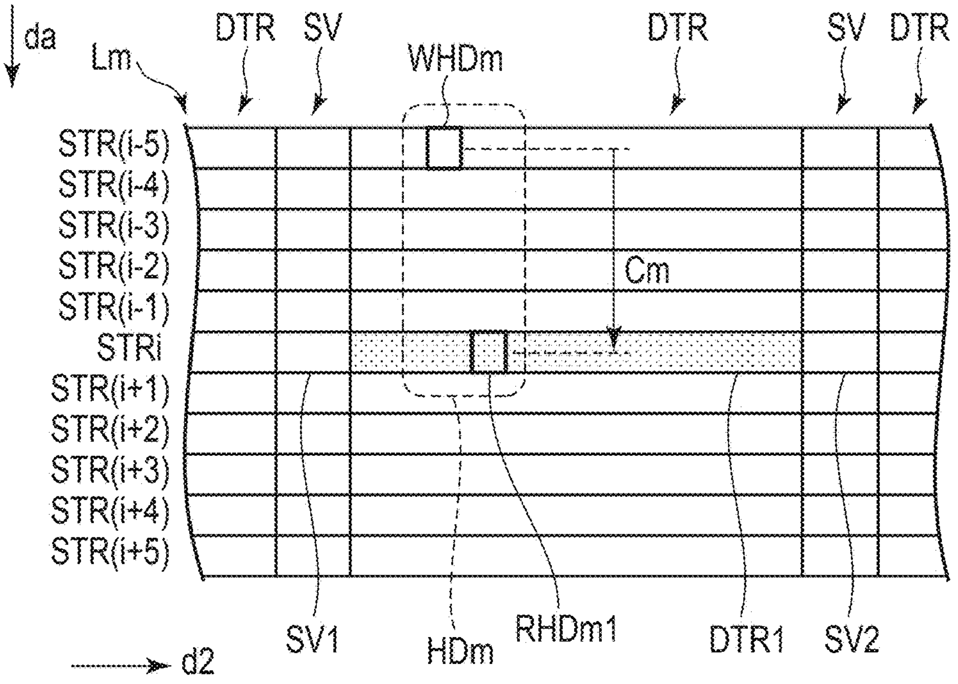
FIG. 20A is a plan view showing part of the one recording layer and the one head according to the embodiment and also showing a read process of reading data from the one data track of the one recording layer using the one read head.
Figure 20B:
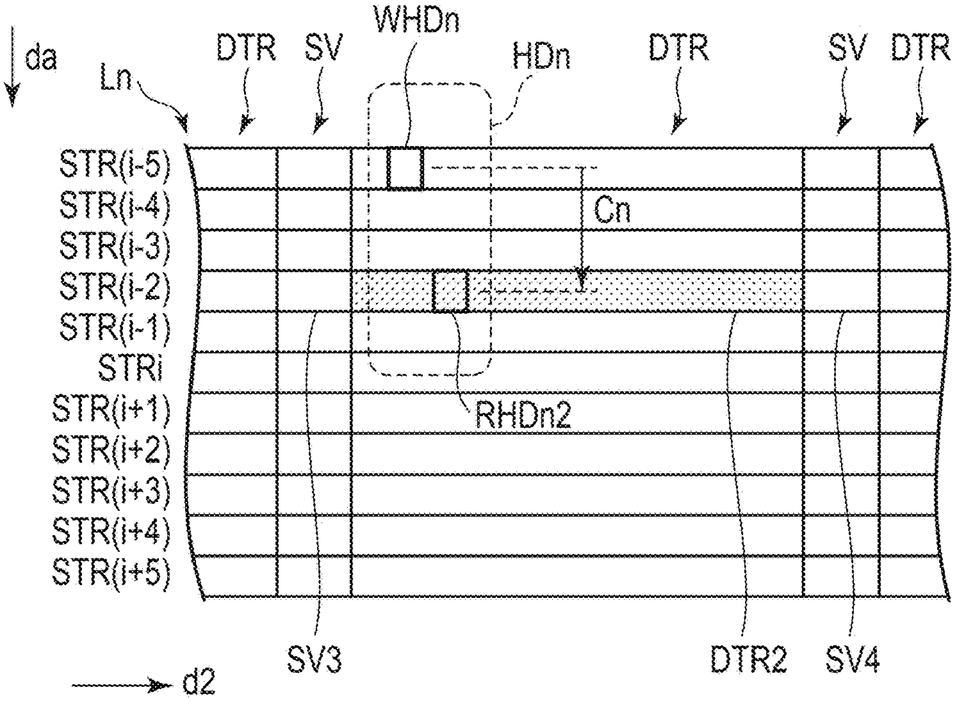
FIG. 20B is a plan view showing part of the other recording layer and the other head according to the embodiment and also showing a read process of reading data from the other data track of the other recording layer using another read head during a period of the read process shown in FIG. 20A.

FIG. 20A is a plan view showing part of the recording layer Lm and the head HDm according to the present embodiment and showing a read process of reading data from the track STRi of the recording layer Lm using the read head RHDm1. FIG. 20B is a plan view showing part of the recording layer Ln and the head HDn according to the present embodiment and showing a read process of reading data from the track STR(i−2) of the recording layer Ln using the read head RHDn2 during the read process of FIG. 20A.

If the read target selection unit 64 selects the track STRi of the recording layer Lm and the track STR(i−2) of the recording layer Ln, the read processing unit 63 drives the actuator (VCM 24), controls a seek operation of seeking the read head RHDm1 and the read head RHDn2, and moves the read head RHDm1 to a position opposed to the track STRi. Accordingly, the read head RHDn2 moves to a position opposed to the track STR(i−2).

Subsequently, the read processing unit 63 controls driving of the selector circuit 3Sb and causes the selector circuit 3Sb to select the read heads RHDm1 and RHDn2, thus allowing data of the track STRi of the recording layer Lm and data of the track STR(i−2) of the recording layer Ln to be read simultaneously through the selector circuit 3Sb.

Based on the signal read by the read head RHDm1 and the signal read by the read head RHDn2, the detection unit 65 can detect a state of the track STRi of the recording layer Lm and a state of the track STR(i−2) of the recording layer Ln.

In order to read data of the track STRi of the recording layer Lm and data of the track STR(i−2) of the recording layer Ln at the same time, data (simplified bit data) for detecting a state of the track STR needs to be written to the tracks STR in advance, as shown in FIGS. 18A, 18B, 19A and 19B.

Assume here that among the directions parallel to the radial direction d1, a first direction da extending from the outer periphery to inner peripheral of the disk DK is a positive direction. Assume also that during a period in which data is written to the track STRi using the write head WHDm, the position of the read head RHDm1 in the radial direction d1 is a reference position, the first offset amount is Cm, the second offset amount is Cn and the third offset amount is C(m, n).

Then, assume that the offset correction amount calculated from −Cm+Cn+C(m, n) is ΔCR.

On the above assumption, when data is written to the track STR(i−2) using the write head WHDn, the write processing unit 62 has only to offset the read head RHDn2 from the reference position by ΔCR in the first direction da to oppose the write head WHDn to the track STR(i−2) of the recording layer Ln. As a result, data can be written to the track STRi of the recording layer Lm and the track STR(i−2) of the recording layer Ln, where the data can be read simultaneously.

Using the offset correction amount ΔCR makes it possible to write data to a desired radial position (position in the radial direction d1) of each recording layer L. Thus, the heads HDm and HDn need not overlap in a direction along the axis of rotation of the disk DK or the track STRi of the recording layer Lm and the track STRi of the recording layer Ln need not overlap. For example, the track pitches of a plurality of recording layers L need not be the same.

In addition, the heads HDm and HDn may be displaced in the circumferential direction of the disk DK, and the servo areas of the recording layers Lm and Ln may also be displaced in the circumferential direction. Next, pay attention to a read process in which a displacement of the head HD and that of the servo area in the circumferential direction are considered.

Figure 21:
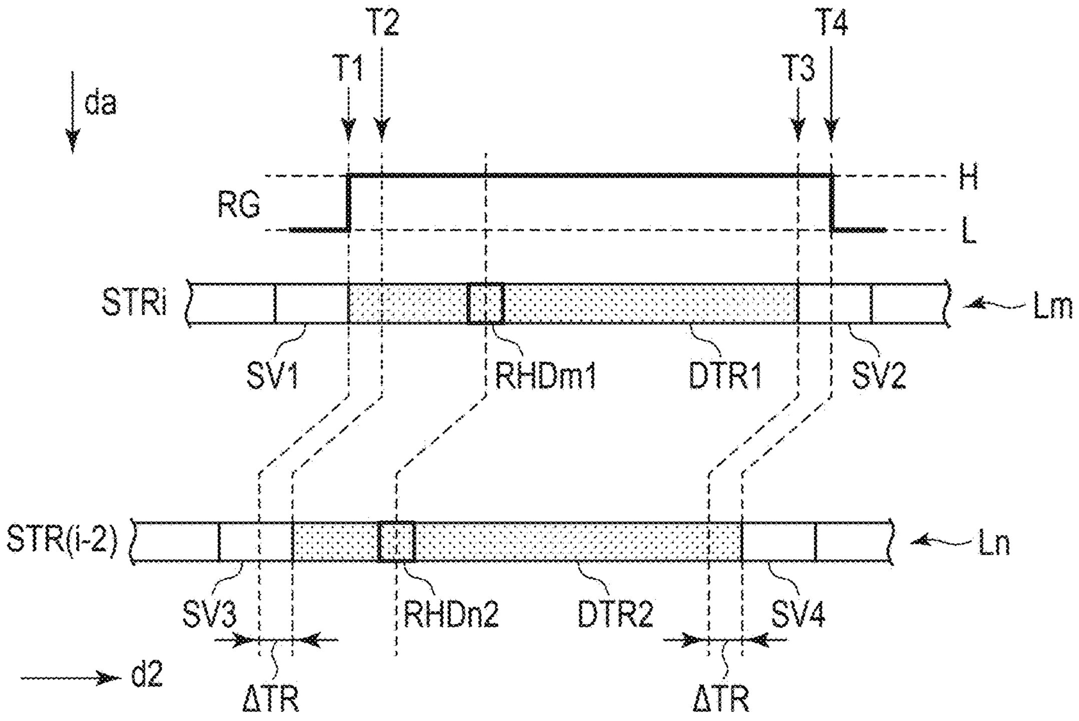
FIG. 21 is a diagram showing a read process of simultaneously reading data of the one data track of the one recording layer and data of the other data track of the other recording layer in the embodiment and also showing a read gate, and illustrating a read process to be performed when timing at which the other read head reaches a predetermined read position is later than timing at which the one read head reaches a predetermined read position.

FIG. 21 is a diagram showing a read process of simultaneously reading data of the track STRi of the recording layer Lm and data of the track STR(i−2) of the recording layer Ln in the present embodiment and also showing a read gate RG, and illustrating a read process to be performed when timing at which the read head RHDn2 reaches a predetermined read position is later than timing at which the the read head RHDm1 reaches a predetermined read position.

As shown in FIGS. 21 and 13, a gate generation unit 151 can generate a read gate RG. A gate detection unit 14D can cause the read processing unit 63 to perform a read process when it detects that the read gate RG is asserted. The read heads RHDm1 and RHDn2 travel above the track STRi of the recording layer Lm and the track STR(i−2) of the recording layer Ln, respectively in a traveling direction d2.

The track STRi of the recording layer Lm and the track STR(i−2) of the recording layer Ln each have a plurality of servo areas SV and a plurality of data areas DTR, which are arranged alternately in the circumferential direction.

In the track STRi of the recording layer Lm, the servo areas SV include a first servo area SV1 and a second servo area SV2, and the data areas DTR include a first data area DTR1 located before the second servo area SV2 following the first servo area SV1 in the traveling direction d2.

In the track STR(i−2) of the recording layer Ln, the servo areas SV include a third servo area SV3 and a fourth servo area SV4, and the data areas DTR include a second data area DTR2 located before the fourth servo area SV4 following the third servo area SV3 in the traveling direction d2.

Of the servo areas SV of the track STR(i−2) of the recording layer Ln, the third servo area SV3 is a servo area to which the read head RHDn2 is closest when the read head RHDm1 is opposed to the first servo area SV1.

Of the servo areas SV of the track STR(i−2) of the recording layer Ln, the fourth servo area SV4 is a servo area to which the read head RHDn2 is closest when the read head RHDm1 is opposed to the second servo area SV2.

Assume here that timing at which the read head RHDm1 passes a position at a tail end of the first servo area SV1 of the track STRi of the recording layer Lm is first timing T1, timing at which the read head RHDn2 passes a position at a tail end of the third servo area SV3 of the track STR(i−2) of the recording layer Ln is second timing T2, and a correction period that is a time period between the first timing T1 and the second timing T2 is ΔTR.

FIG. 21 shows a case where the second timing T2 is later than the first timing T1. In this case, the gate generation unit 151 asserts the read gate RG at the first timing T1, maintains the read gate RG in the asserted state at the third timing T3 when the read head RHDm1 passes a head position of the second servo area SV2 of the track STRi of the recording layer Lm, and changes the read gate RG to a negated state at the fourth timing T4 when ΔTR has elapsed from the third timing T3.

Thus, all data in the first data area DTR1 and all data in the second data area DTR2 can be read.

Figure 22:
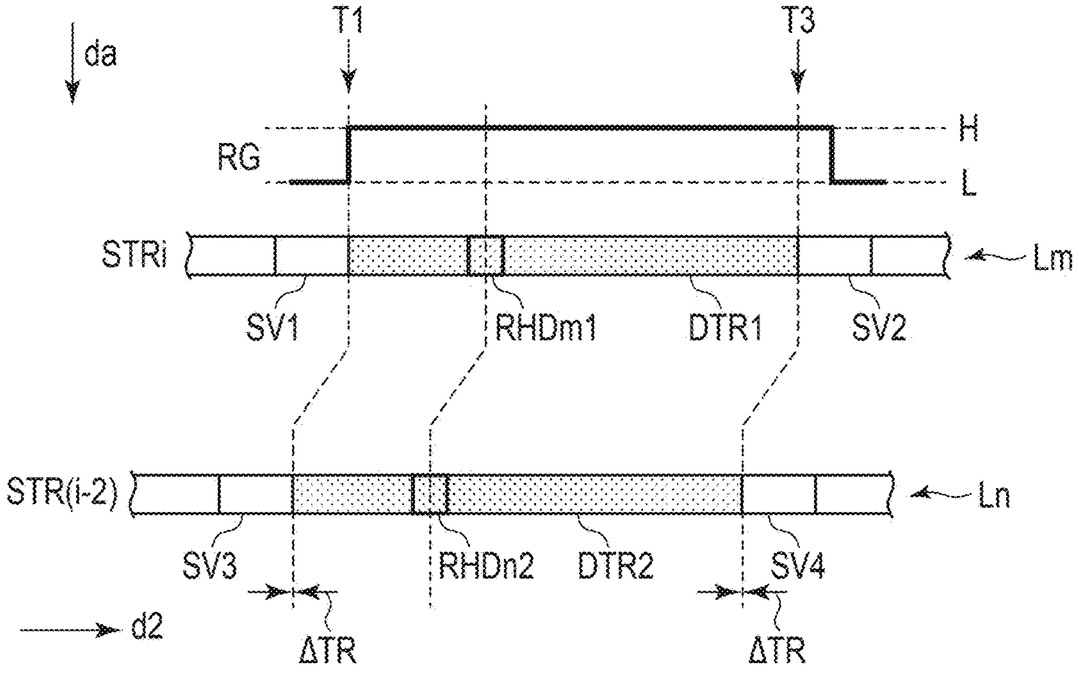
FIG. 22 is a diagram showing a read process of simultaneously reading data of the one data track of the one recording layer and data of the other data track of the other recording layer in the embodiment and also showing a read gate, and illustrating a read process to be performed when timing at which the other read head reaches a predetermined read position coincides with timing at which the one read head reaches a predetermined read position.

FIG. 22 is a diagram showing a read process of reading data of the track STRi of the recording layer Lm and data of the track STR(i−2) of the recording layer Ln simultaneously in the present embodiment, a diagram showing the read gate RG, and a diagram illustrating a read process to be performed when timing at which the read head RHDn2 reaches a predetermined read position coincides with timing at which the read head RHDm1 reaches the predetermined read position. FIG. 22 shows a case where the second timing T2 coincides with the first timing T1.

As shown in FIGS. 22 and 13, the gate generation unit 151 asserts the read gate RG at the first timing T1 and changes the read gate RG to a negated state at the third timing T3.

Thus, all data in the first data area DTR1 and all data in the second data area DTR2 can be read.

Figure 23:
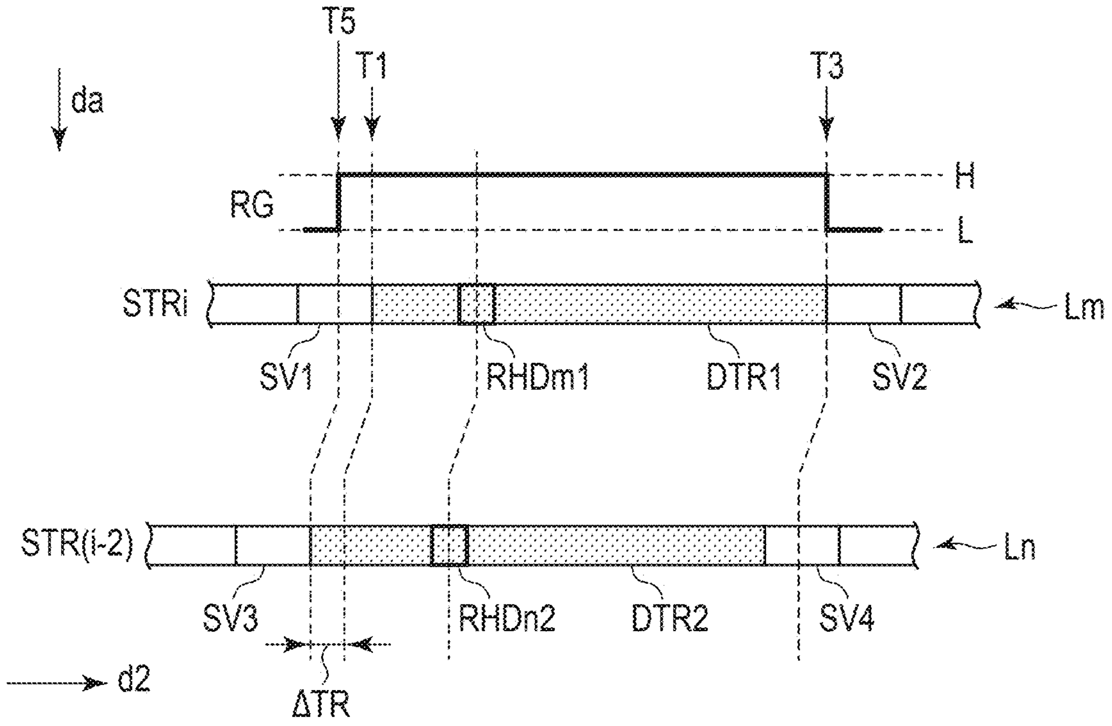
FIG. 23 is a diagram showing a read process of simultaneously reading data of the one data track of the one recording layer and data of the other data track of the other recording layer in the embodiment and also showing a read gate, and illustrating a read process to be performed when timing at which the other read head reaches a predetermined read position is earlier than timing at which the one read head reaches a predetermined read position.

FIG. 23 is a diagram showing a read process of reading data of the track STRi of the recording layer Lm and data of the track STR(i−2) of the recording layer Ln simultaneously in the present embodiment, a diagram showing the read gate RG, and is a diagram illustrating a read process to be performed when timing at which the read head RHDn2 reaches a predetermined read position is earlier than timing at which the read head RHDm1 reaches the predetermined read position. FIG. 23 shows a case where the second timing T2 is earlier than the first timing T1.

As shown in FIGS. 23 and 13, the gate generation unit 151 asserts the read gate RG at fifth timing T5 before ΔTR of the first timing T1, maintains the read gate RG in an asserted state at the first timing T1, and changes the read gate RG to a negated state at the third timing T3.

Thus, all data in the first data area DTR1 and all data in the second data area DTR2 can be read. In both cases of FIGS. 21 to 23, the data of the first data area DTR1 and the data of the second data area DTR2 can be read without omission.

Next, a description of the management of defects on the recording layer L by the management unit 66 will be provided.

Figure 24:
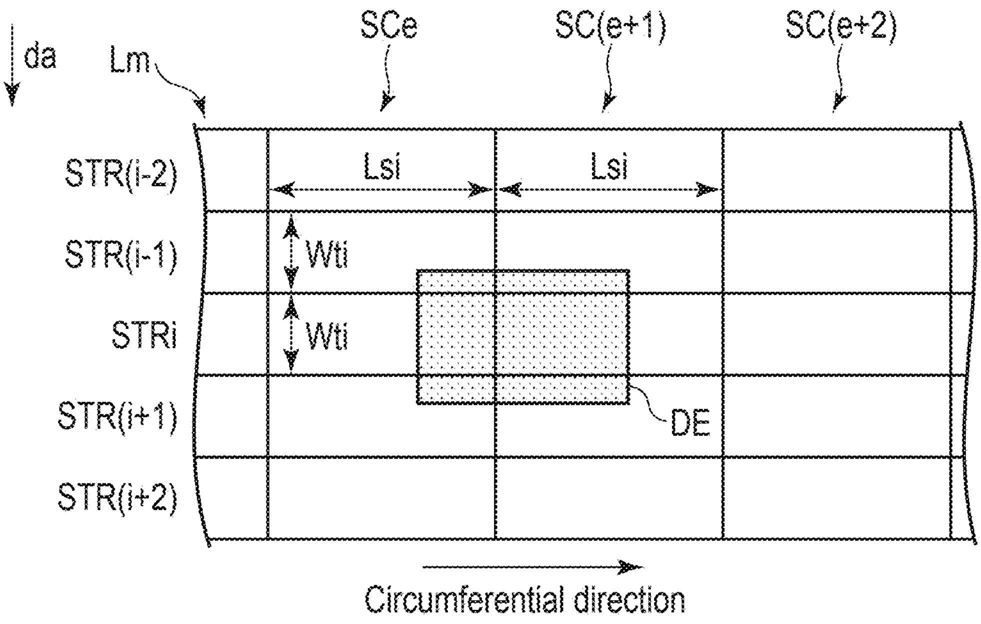
FIG. 24 is a plan view showing part of the one recording layer according to the embodiment and also showing a state in which a defect detected on the one recording layer extends over six adjacent sectors.
Figure 25:
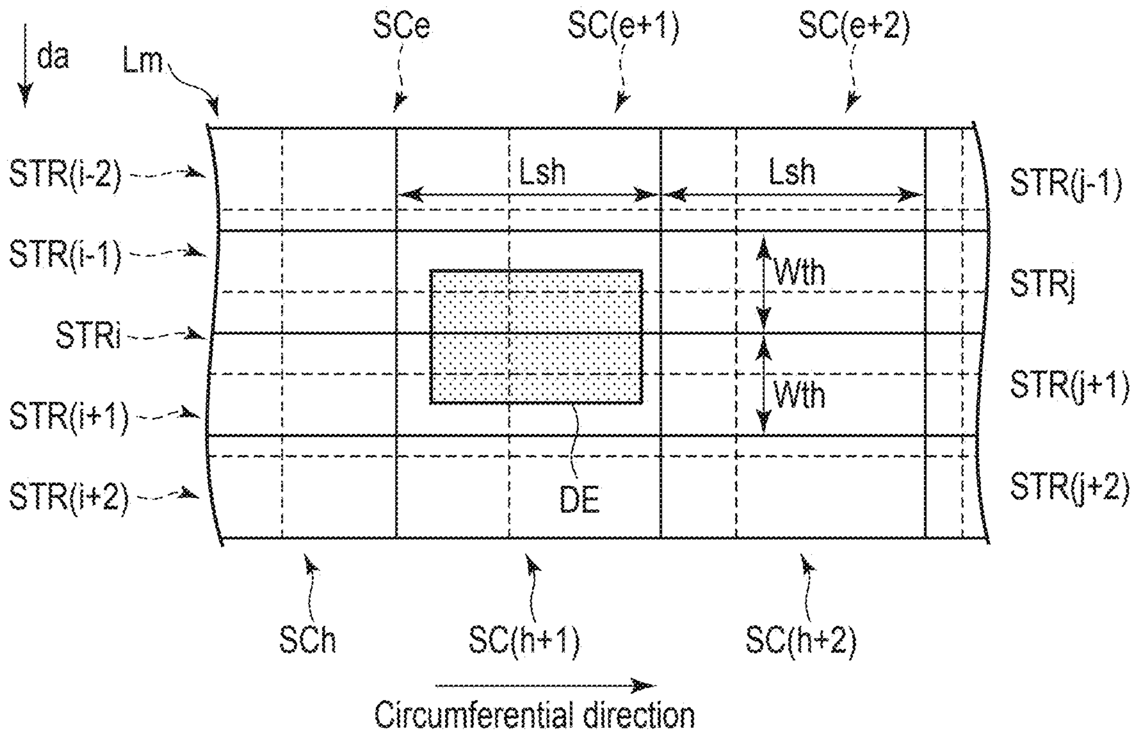
FIG. 25 is a plan view showing part of the one recording layer according to the embodiment, and showing a state subsequent to the state of FIG. 24, in which the track width and the sector length of the one recording layer were changed and the defect extends over two adjacent sectors.

FIG. 24 is a plan view showing part of the recording layer Lm according to the present embodiment and also showing a state in which a defect DE detected on the recording layer Lm extends over six adjacent sectors SC. FIG. 25 is a plan view showing part of the recording layer Lm according to the present embodiment and showing a state subsequent to the state of FIG. 24, in which the track width Wt and sector length Ls of the recording layer Lm were changed and the defect DE extends over two adjacent sectors SC.

As shown in FIGS. 24 and 13, assume that the width of each track STR in the radial direction d1 is track width Wti and the length of each data sector STR in the circumferential direction is sector length Lsi. When the detection unit 65 detects a defect DE in the recording layer Lm, the management unit 66 can manage the information of the area of the defect DE by a reference width unit whose resolution is higher than that of the track width Wti in the radial direction d1 and by a reference length unit resolution is higher than that of the sector length Lsi in the circumferential direction.

Consider here that the track width Wt and sector length Ls are changed in the middle of a period during which a user is using the magnetic disk device 1.

As shown in FIGS. 25 and 13, the track width Wti is changed to track width Wth and the sector length Lsi is changed to sector length Lsh. In this case, the management unit 66 determines that the sector SC(h+1) of the track STRj of the recording layer Lm and the sector SC(h+1) of the track STR(j+1) thereof are abnormal sectors and can handle them as non-use sectors NSC.

It can be seen that the number of non-use sectors NSC has decreased from 6 to 2 as compared with that before changing the track width Wt and sector length Ls shown in FIG. 24. Since the number of non-use sectors NSC can be decreased in some cases, it is desirable to manage the track width Wt in reference width units with higher resolution and to manage the sector length Ls in reference length units with higher resolution.

The magnetic disk device 1 according to the present embodiment, configured as described above, includes the plurality of recording layers L, the plurality of write heads WHD, the plurality of read heads RHD, the selector circuit 3Sb, the read target selection unit 64, the read processing unit 63 and the detection unit 65.

The recording layers L are provided on the same disk DK or different disks DK and each have a recording layer Lm and a recording layer Ln. The write heads WHD include a write head WHDm that writes data to the recording layer Lm and a write head WHDn that writes data to the recording layer Ln. The read heads RHD includes a read head RHDm1 that reads data from the recording layer Lm and a read head RHDn2 that reads data from the recording layer Ln.

The selector circuit 3Sb is connected to the read heads RHD to allow two or more read heads to be selected among the read heads RHD. The read processing unit 63 can perform a read process of reading data from each of the recording layers L.

When the read target selection unit 64 selects the recording layers Lm and Ln, the read processing unit 63 controls driving of the selector circuit 3Sb and causes the selector circuit 3Sb to select the read heads RHDm1 and RHDn2 to allow data of the recording layer Lm and data of the recording layer Ln to be read simultaneously through the selector circuit 3Sb. The detection unit 65 can detect a state of the recording layer Lm and a state of the recording layer Ln based on the signal read by the read head RHDm1 and the signal read by the read head RHDn2.

Since data of the two recording layers L can be read simultaneously, the magnetic disk device 1 can detect a defect on the disk DK with efficiency.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the selector circuit 3Sb may be configured to select three or more read heads RHD among the read heads RHD. In this case, the head amplifier IC 130 has only to include three or more read amplifiers 3R including read amplifiers 3R1 and 3R2. The read channel 14R2 has only to include three or more processing circuits 4PC including first and second processing circuits 4PC1 and 4PC2. Since, therefore, data of three or more recording layers L can be read simultaneously, a defect on the disk DK can be detected more efficiently.

The above-described technology is not limited to a hybrid recording magnetic disk device, but may be applied to a shingled magnetic recording magnetic disk device or a conventional magnetic recording magnetic disk device.

What is claimed is:

1. A magnetic disk device comprising:

a plurality of recording layers including a first recording layer and a second recording layer which are provided on a same disk or different disks;

a plurality of write heads including a first write head which writes data to the first recording layer and a second write head which writes data to the second recording layer;

a plurality of read heads including a first read head which reads data from the first recording layer and a second read head which reads data from the second recording layer;

a selector circuit connected to the plurality of read heads to allow two or more read heads to be selected from among the plurality of read heads;

a read target selection unit;

a read processing unit which allows a read process to be performed to read data from each of the recording layers; and a detection unit, wherein when the read target selection unit selects the first recording layer and the second recording layer:

the read processing unit controls driving of the selector circuit and causes the selector circuit to select the first read head and the second read head so as to read data of the first recording layer and data of the second recording layer simultaneously through the selector circuit; and the detection unit detects a state of the first recording layer and a state of the second recording layer based on a signal read by the first read head and a signal read by the second read head, the signal read by the second read head is a readback signal generated from data written to the second recording layer with the second write head positioned at a target position on the second recording layer, and the target position is determined by performing a correction calculation using a position of the first read head as a reference position and an offset correction amount calculated based on the position of the first read head, a position of the first write head, a position of the second read head, and a position of the second write head.

2. The magnetic disk device of claim 1, wherein the data written to the first recording layer and the data written to the second recording layer are bit data whose code arrangement is simpler than that of user data.

3. The magnetic disk device of claim 1, further comprising:

a management unit, wherein each of the recording layers includes a plurality of data tracks arranged in a radial direction of the disk, each of the data tracks includes a plurality of data sectors arranged in a circumferential direction of the disk, and when the detection unit detects a defect in the first recording layer, the management unit manages information regarding an area of the first recording layer including the defect, determines as abnormal sectors one or more data sectors located in the area including the defect, and removes each of the abnormal sectors from a target of a write process of writing data and the read process.

4. The magnetic disk device of claim 1, further comprising:

a first read channel including a plurality of processing circuits connected to the selector circuit, the processing circuits including a first processing circuit and a second processing circuit, wherein when the read target selection unit selects the first recording layer and the second recording layer, the first processing circuit processes the signal read by the first read head and outputs a first processing signal whose noise components are reduced, the second processing circuit processes the signal read by the second read head and outputs a second processing signal whose noise components are reduced, and the detection unit detects a state of the first recording layer and a state of the second recording layer based on the first processing signal and the second processing signal.

5. The magnetic disk device of claim 1, further comprising:

a plurality of arms including a first arm;

an actuator which moves the arms;

a second read channel connected to the selector circuit and including a processing circuit for two-dimensional magnetic recording technology; and a write processing unit which allows a write process of writing data to each of the recording layers, wherein the plurality of read heads further include a third read head supported by the first arm together with the first read head to read data from the first recording layer, the first recording layer includes a first data track, the write processing unit writes user data to the first data track using the first write head, and when the read target selection unit selects the first data track of the first recording layer, the read processing unit drives the actuator, controls a seek operation of using the first read head and the third read head, and moves the first read head and the third read head to positions opposed to the first data track, the read processing unit controls driving of the selector circuit, causes the selector circuit to select the first read head and the third read head, and reads the user data of the first data track using the first read head and third read head independently through the selector circuit, and the processing circuit combines a signal read by the first read head and a signal read by the third read head and outputs a combined processing signal whose noise components are reduced.

6. The magnetic disk device of claim 1, further comprising:

a plurality of arms including a first arm and a second arm;

an actuator which moves the arms uniformly; and a write processing unit which allows a write process of writing data to each of the recording layers, wherein the first arm supports the first write head and the first read head, the second arm supports the second write head and the second read head, the first recording layer includes a first data track, the second recording layer includes a second data track, the write processing unit writes data to the first data track using the first write head and writes data to the second data track using the second write head, when the read target selection unit selects the first data track of the first recording layer and the second data track of the second recording layer, the read processing unit drives the actuator to control a seek operation using the first read head and the second read head, to move the first read head to a position opposed to the first data track, and to move the second read head to a position opposed to the second data track, the read processing unit controls driving of the selector circuit to cause the selector circuit to select the first read head and the second read head, and to read the data of the first data track and the data of the second data track simultaneously through the selector circuit, and the detection unit detects a state of the first data track and a state of the second data track based on a signal read by the first read head and a signal read by the second read head, and the write processing unit positions the second write head to be opposed to the second data track by offsetting the position of the first read head serving as the reference position by ΔCR in a first direction when writing the data to the second data track using the second write head, where the first direction parallel to a radial direction of the disk and from an outer circumference of the disk to an inner circumference thereof is defined as a positive direction, a first offset amount, which is a distance from the first write head to the first read head in the first direction, is defined as Cm, a second offset amount, which is a distance from the second write head to the second read head in the first direction, is defined as Cn, a third offset amount, which is a distance from the first read head to the second read head in the first direction, is defined as C(m, n), and the offset correction amount, ΔCR, is equal to Cm+Cn+C(m, n).

7. The magnetic disk device of claim 6, further comprising:

a gate generation unit which generates a read gate; and a gate detection unit which causes the read processing unit to perform a read process when the gate detection unit detects that the read gate is asserted, wherein the first read head and the second read head travel above the first data track and the second data track, respectively, in a traveling direction along a circumferential direction of the disk, the first data track and the second data track respectively include a plurality of servo areas and a plurality of data areas, which are arranged alternately in the circumferential direction, in the first data track, the plurality of servo areas include a first servo area and a second servo area, and the plurality of data areas include a first data area before the second servo area following the first servo area in the traveling direction, in the second data track, the plurality of servo areas include a third servo area and a fourth servo area, and the plurality of data areas include a second data area before the fourth servo area following the third servo area in the traveling direction, of the plurality of servo areas of the second data track, the third servo area is made closest to the second read head when the first read head is opposed to the first servo area, a timing at which the first read head passes a position at the tail end of the first servo area of the first data track is set as a first timing, a timing at which the second read head passes a position at the tail end of the third servo area of the second data track is set as a second timing, a correction period that is a time period between the first timing and the second timing is defined as ΔTR, if the second timing is later than the first timing, the gate generation unit asserts the read gate at the first timing, maintains the read gate in an asserted state at a third timing when the first read head passes a position at the front end of the second servo area of the first data track, and changes the read gate into a negated state at a fourth timing when ΔTR has elapsed from the third timing, when the second timing coincides with the first timing, the gate generation unit asserts the read gate at the first timing, and changes the read gate into a negated state at the third timing, and when the second timing is earlier than the first timing, the gate generation unit asserts the read gate at fifth timing that is ΔTR before the first timing, maintains the read gate in an asserted state at the first timing, and changes the read gate into a negated state at the third timing.

8. The magnetic disk device of claim 1, further comprising:

a management unit, wherein each of the recording layers includes a plurality of data tracks arranged in a radial direction of the disk, each of the data tracks includes a plurality of data sectors arranged in a circumferential direction of the disk, a width of each of the data tracks in the radial direction is defined as a track width, a length of each of the data sectors in the circumferential direction is defined as a sector length, and when the detection unit detects a defect in the first recording layer, the management unit manages information regarding an area where the defect exists by a reference width unit whose resolution is higher than that of the track width in the radial direction and by a reference length unit whose resolution is higher than that of the sector length in the circumferential direction.

9. The magnetic disk device of claim 1, further comprising:

a write processing unit which allows a write process to be performed to write data to each of the recording layers, wherein each of the recording layers includes a plurality of data tracks arranged in a radial direction of the disk, in a first overwrite direction parallel to the radial direction, the write processing unit allows shingled magnetic recording to be selected to overwrite data of a third data track of the first recording layer over data of a first data track thereof, and in a second overwrite direction parallel to the radial direction, the write processing unit allows shingled magnetic recording to be selected to overwrite data of a fourth data track of the second recording layer over data of a second data track thereof.

* * * * *